Nov. 2, 1948.  E. M. S. McWHIRTER ET AL  2,452,589
ELECTRIC REMOTE CONTROL AND INDICATION SYSTEM
Filed Jan. 14, 1944  13 Sheets-Sheet 2

INVENTORS
ERIC MALCOLM SWIFT McWHIRTER
HUGH JENNINGS WARD
BY
ATTORNEY

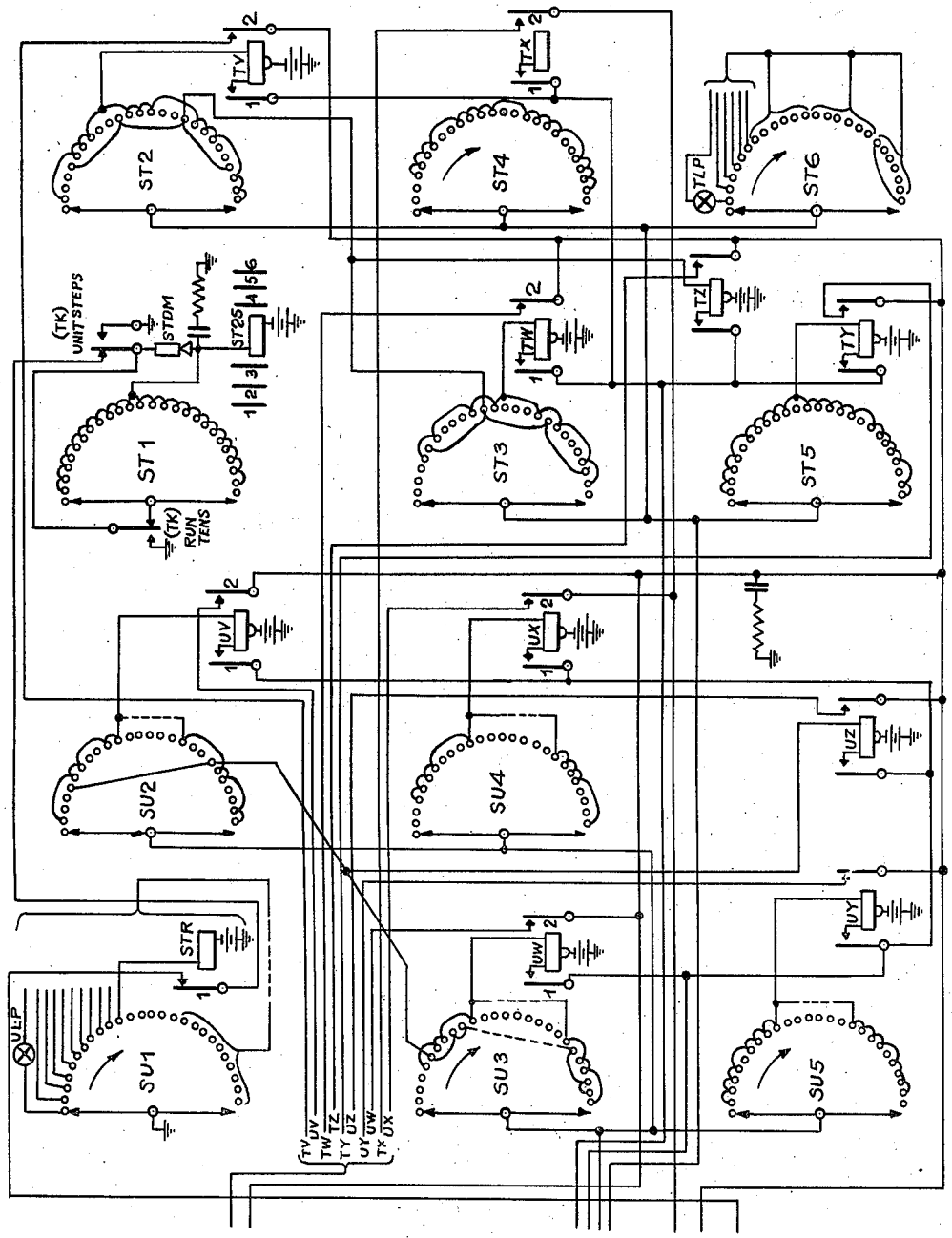

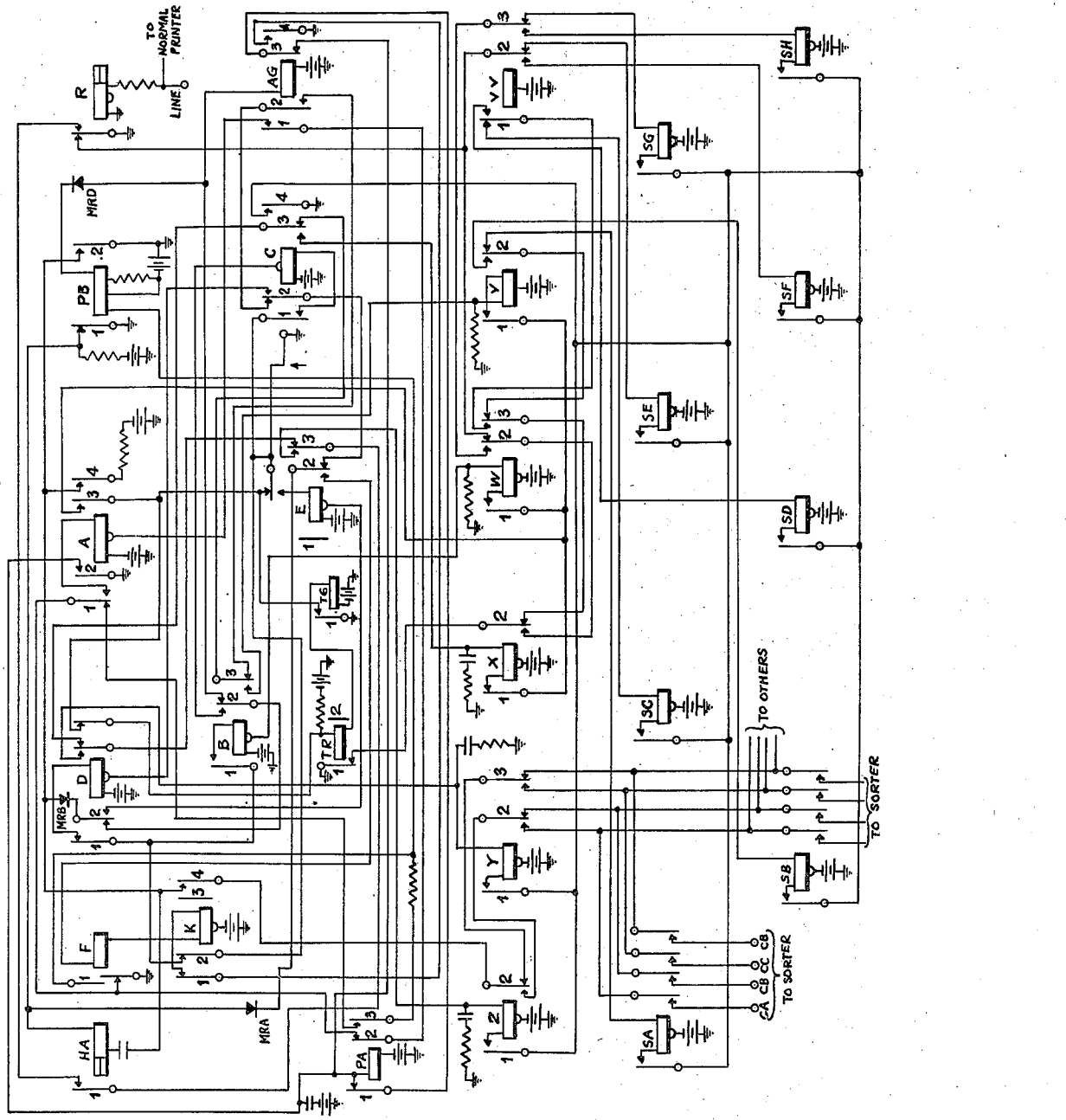

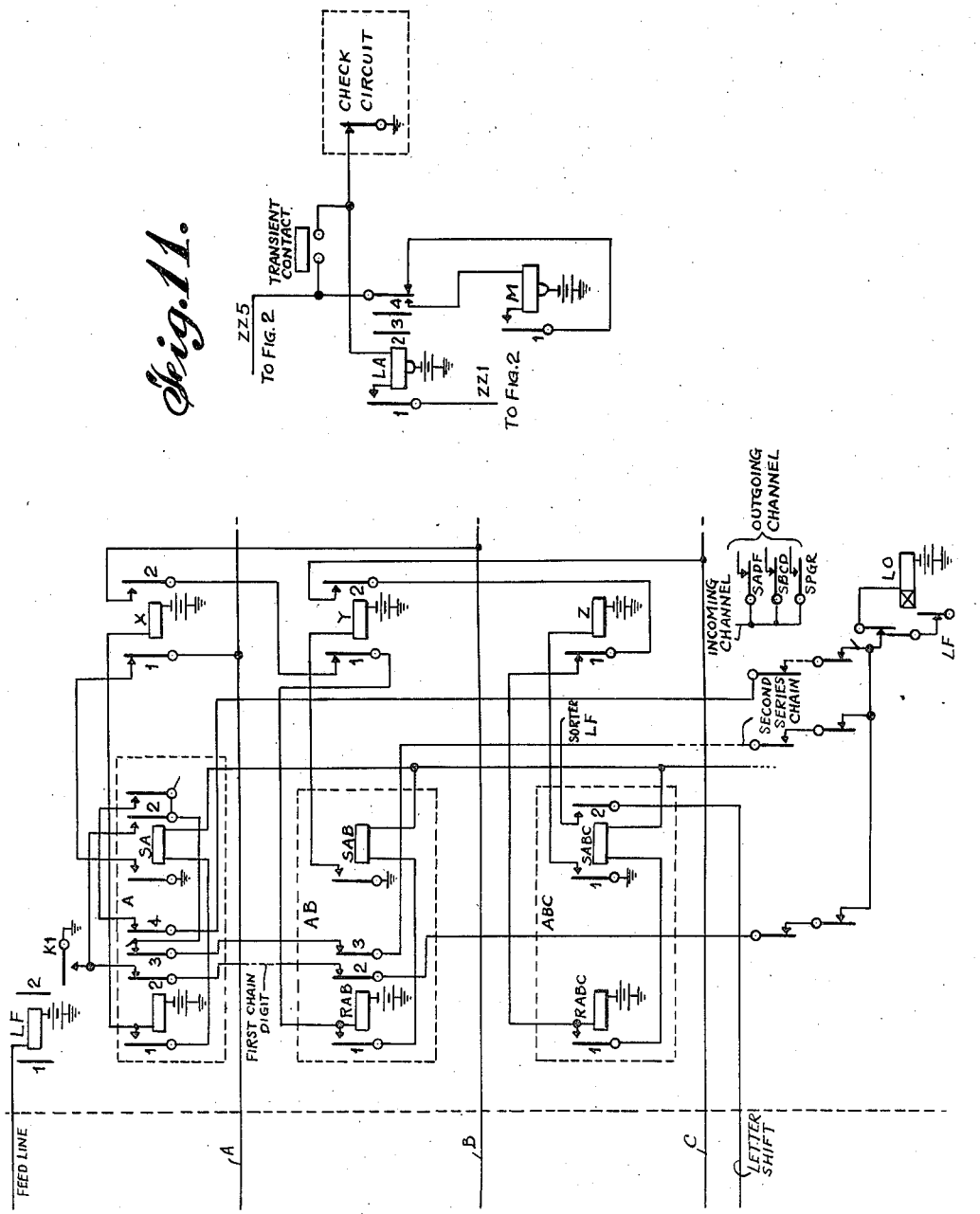

Nov. 2, 1948.　　　E. M. S. McWHIRTER ET AL　　　2,452,589
ELECTRIC REMOTE CONTROL AND INDICATION SYSTEM
Filed Jan. 14, 1944　　　　　　　　　　　　　13 Sheets-Sheet 13

INVENTORS
ERIC MALCOLM SWIFT McWHIRTER
HUGH JENNINGS WARD
BY
Edward D. Kinney
ATTORNEY Patented Nov. 2, 1948

2,452,589

UNITED STATES PATENT OFFICE 2,452,589

ELECTRIC REMOTE CONTROL AND INDICATION SYSTEM

Eric Malcolm Swift McWhirter and Hugh Jennings Ward, London, England, assignors to Standard Telephones and Cables Limited, London, England, a company of Great Britain Application January 14, 1944, Serial No. 518,250
In Great Britain January 22, 1943

32 Claims. (Cl. 177—353)

This invention relates to electrical remote control and/or indicating systems, such as may be used, for example, in networks of electrical supply undertakings for indicating at a control station the condition of various equipments at a substation. These equipments may be kilowatt hour meters, circuit breakers, transformers of variable tapping and so forth.

One object of the invention is to utilise the existing channels between stations for the transmission of signals in one direction for indication purposes and/or in the other direction for control purposes.

Another object is to enable a permanent record to be made of the occurrences such as meter readings or tripping of circuit breakers. The permanent record may include an indication of the time.

Still another object of the invention is to enable indications sent over a signal channel to be routed to a plurality of indicating devices in accordance with the character of the signals sent.

In its broadest aspect the invention consists in an electric remote supervisory and/or control system in which the supervisory and/or control signals are sent between a sub-station and a control station in a code from which a printed record can be made.

In an embodiment of the invention use is made of a telegraph system of the teleprinter kind consisting, for example, of a teleprinter at each end connected to the line over a converter which performs an interconversion between D. C. impulses and impulses of alternating current of voice frequency.

In addition to the teleprinter at each end of the line there is connected at each end a sending and receiving circuit similar to those described in our prior United Kingdom patent specification No. 555,999 for sending and receiving start-stop code signals. These circuits are well suited for the purpose in view since the sending circuit is readily controlled by electrical marking and the receiving circuit is able to mark electrical circuits for the purpose of indicating, switching, etc.

At a substation the sender is associated with circuits which are each particular to some one or more pieces of equipment. For example, there may be one or more kilowatt hour meters, circuit breakers, or variable tapping transformers and it may be necessary to indicate at the control station the condition of any of these at any time.

In the case of the meters, there are impulsing contacts which are operated as each unit is passed, these contacts being arranged in a counting circuit which comulatively registers the consumption. The condition of the counter circuit at any instant can be translated into a code, for example, a five-unit code recognised by the existence of varying potentials on five leads. These leads pass through some switching mechanism common to all the counter circuits to the sender which functions to convert these five-wire signals into a train of impulses of the usual teleprinter kind, these impulses being applied to the telegraph line and passed over it to the control station where they reach a receiver. Eventually the signals will be passed to a particular indicator where they will be displayed to the controller. The switching mechanism is arranged so that on connecting a meter to a sender the signals representing the meter reading are prefaced by signals representing preliminary information such as the identity of the meter.

The indicators may be of various kinds and may require various kinds of signal for their operation. In particular an indicator may either be capable of receiving a teleprinter code and effecting the translation for itself, or it may require that the teleprinter signals should have been previously translated before their being passed to the indicator circuit. This variety of destination can be taken account of by providing that the receiver shall respond to the initial character in a train of signals, which character serves to indicate the destination. In response to this initial character the receiver operates a switching system by which the rest of the signal can be directed to its destination. The destination may be an equipment capable of performing its own translation of the signals into an indication to be displayed or the receiver itself may perform the translation and through the switching equipment send appropriate signals to an indicator which is incapable of dealing with the teleprinter signals. The discrimination as to whether the receiver is or is not to translate the teleprinter signals is determined by a character or characters in the signals sent from the substation.

In either case it is desired in accordance with this invention to make a permanent record of these indications and, perhaps, the time to which they refer. Accordingly there is permanently associated with the incoming end of the line through the switching mechanism a teleprinter. Also there may be means for giving a special display to the last received indication, it being understood that the controller will have comparatively little interest in the several, perhaps many, items which are presented to him on a control panel but that he has a much greater interest in changes that are occurring and that are represented by the signals just arriving. The timing mechanism is conveniently associated with the sender at the substation and it may be arranged so that after each indication sent from that substation the time is also sent thus serving not only its prime purpose but also the further purpose of indicating the end of the signal.

It is also desirable that the system should not be left simply stagnant for long periods because there is no occasion for the transmission of equipment indicating signals. It is desired to know that the transmission system is continuing to function and that the quiescence is not due to some failure. Therefore, the timing mechanism may be arranged to send the time at say every half minute during periods when no other transmissions are occurring.

In the case of two-way working there will be facilities for sending either indications or control signals from the control station to the substation. There will thus be necessary sender and receiver for this purpose; the sender being controlled over five-wire lines from the several equipment control circuits, and the receiver at the substation converting the incoming teleprinter signals into changes of the various control circuits.

The normal teleprinter signalling system can, of course, be used in an emergency in the case of failure of the system hereinbefore described.

The control signal may consist of two parts one of which conveys the kind of control which it is desired to effect and the other causing its actual occurrence, there being provided in known manner means for checking back from the substation that the signal representing the kind of control has been correctly received, before the signal causing the control to be exercised is sent.

The description that follows relates to the accompanying drawings, in which.

Figure 1:
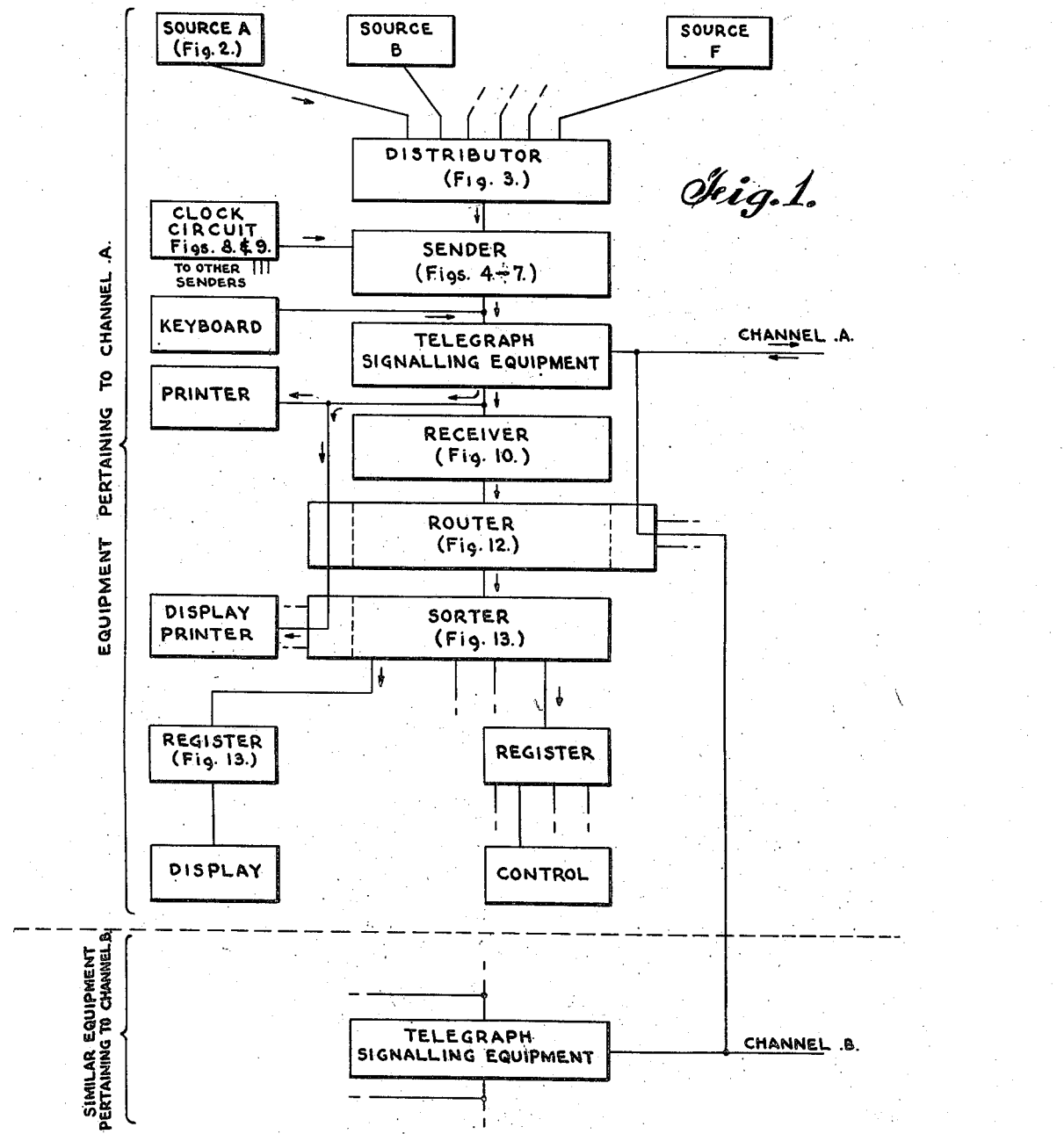
Fig. 1 is a block schematic of a remote control and supervisory system in accordance with the invention.
Figure 2:
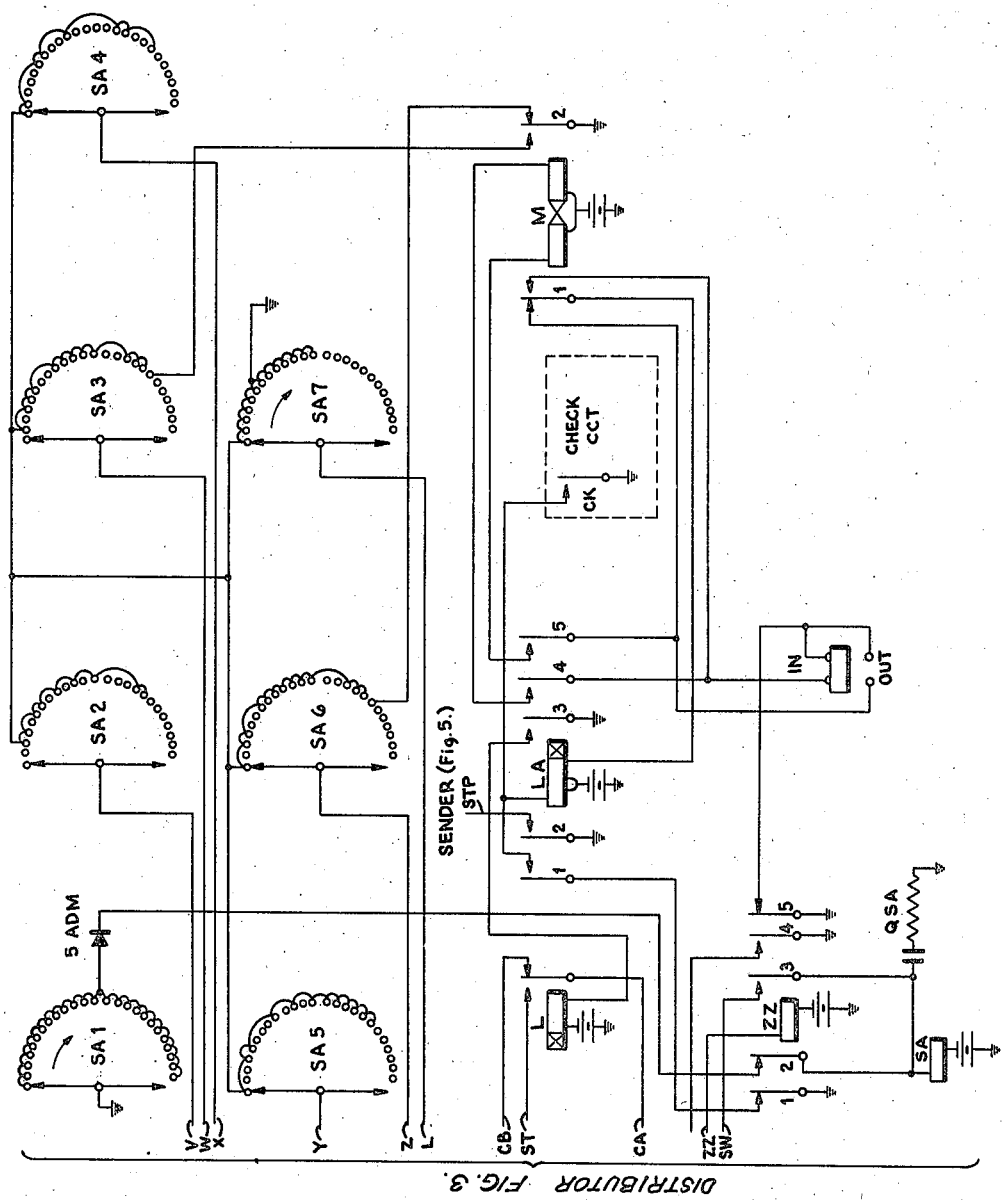
Fig. 2 is the circuit diagram of the source of Fig. 1.
Figure 5:
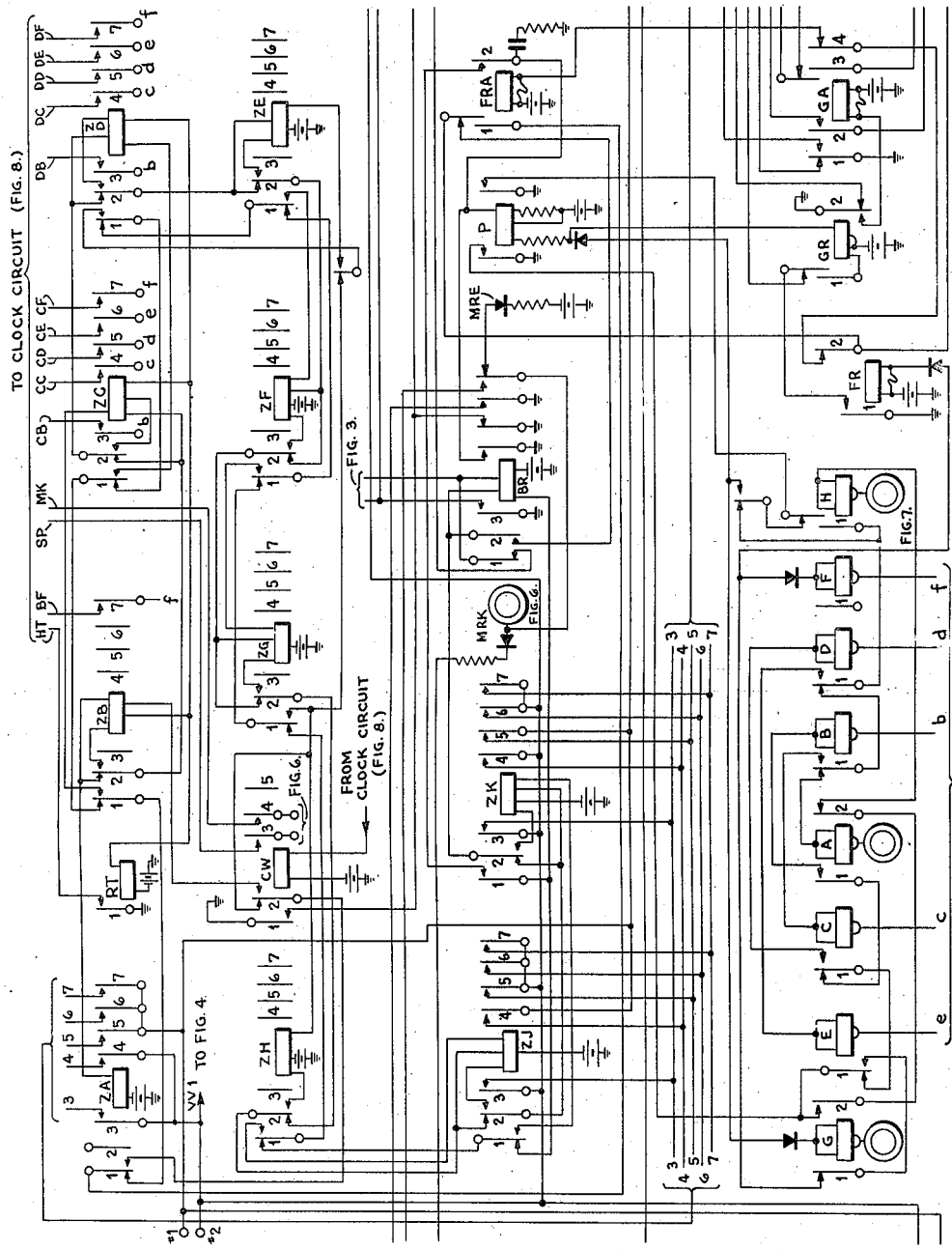
Figure 6:
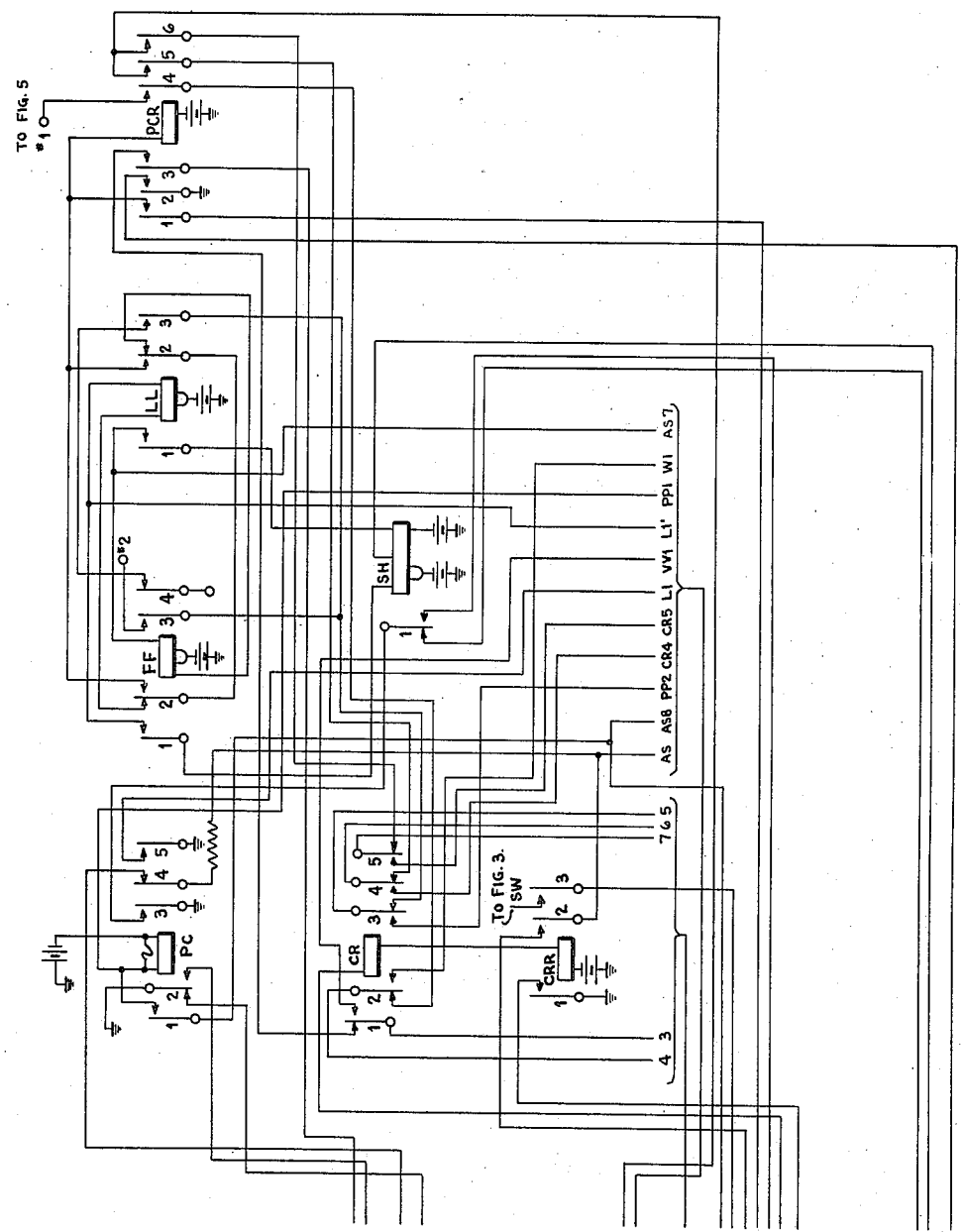
Figure 7:
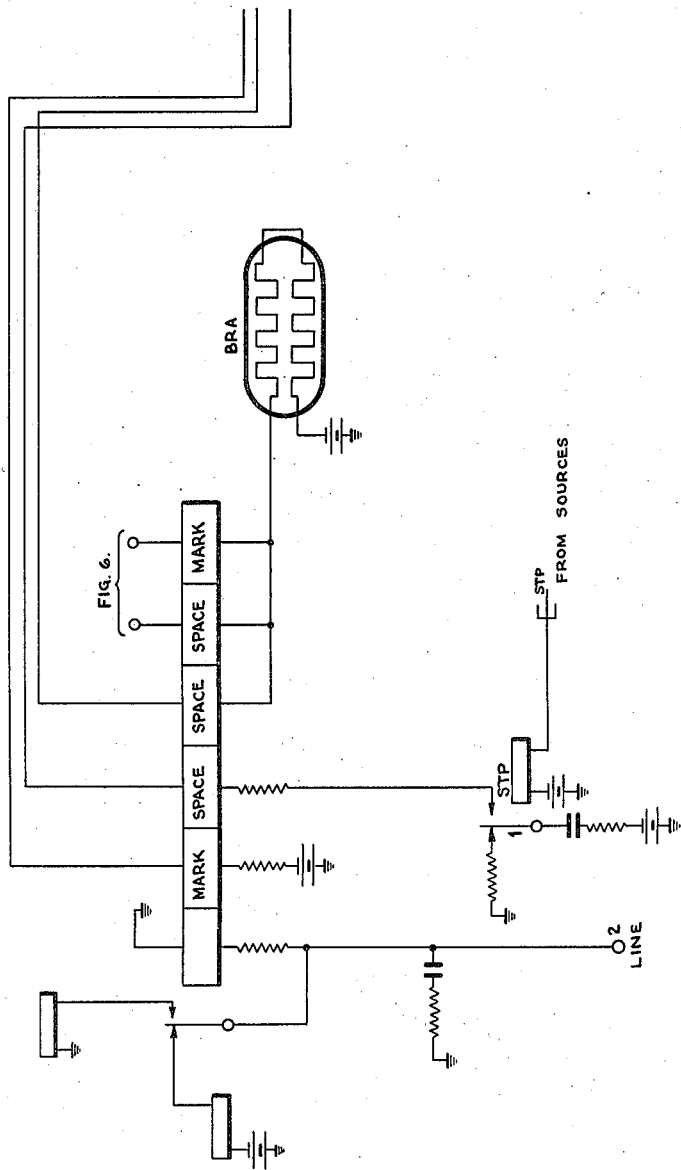
Figure 8:
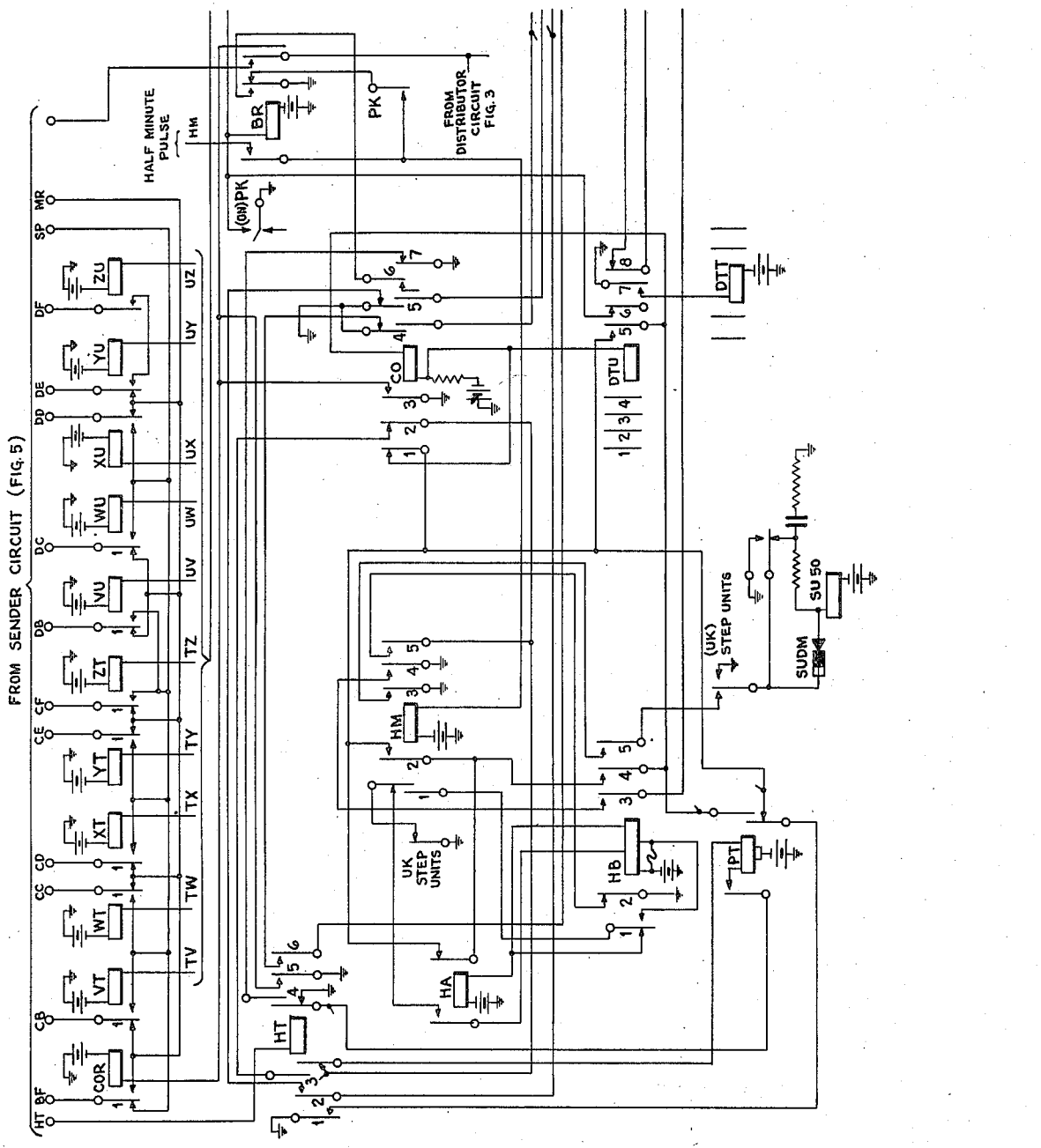
Figure 13:
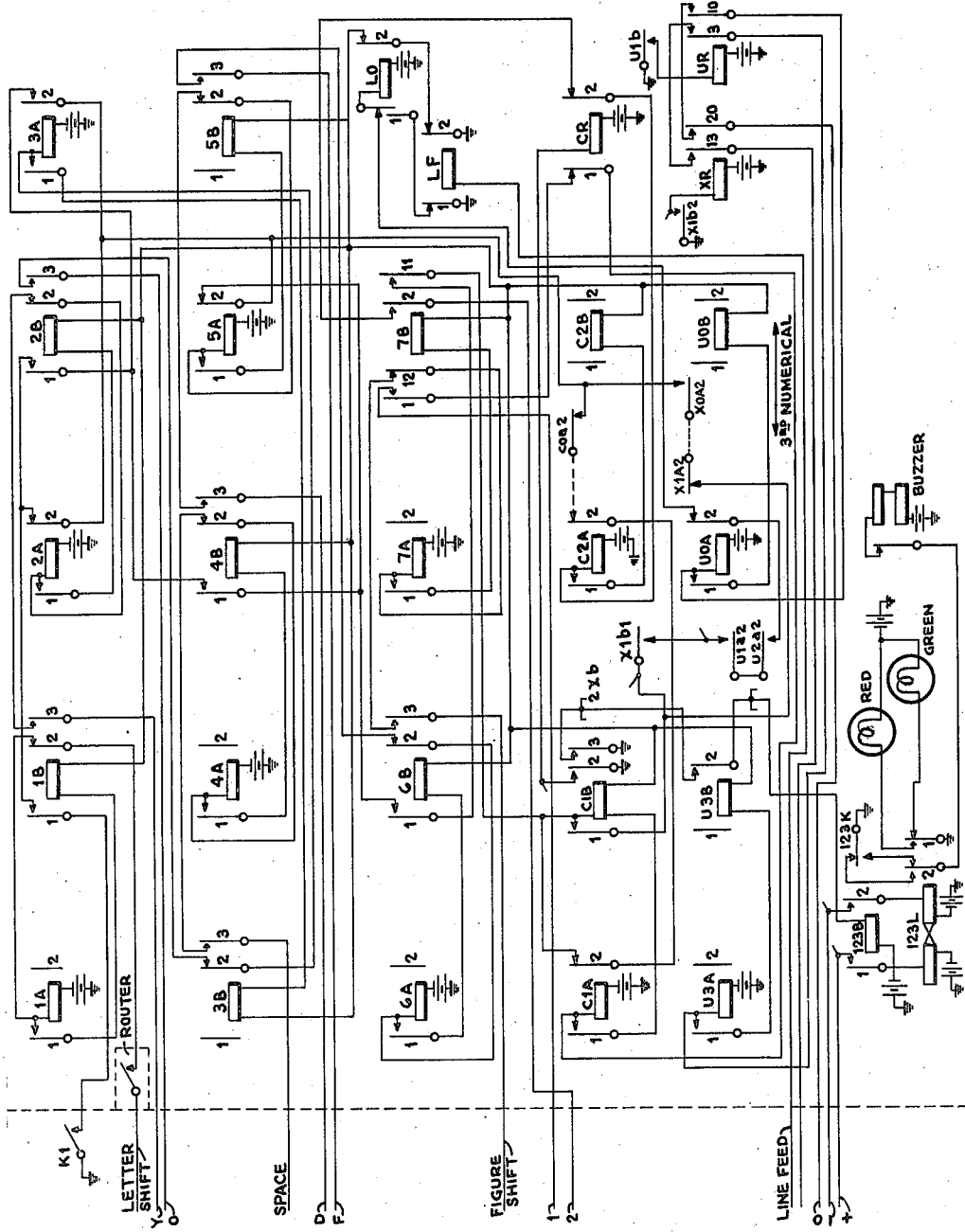

Figs. 4 to 7 when taken together are the circuit diagrams of the sender of Fig. 6;

Figs. 8 and 9 taken together are the circuit diagrams of the clock circuit associated with the sender;

Fig. 10 is the circuit diagram of the receiver of Fig. 1;

Fig. 11 is the circuit diagram of part of the source that has been modified as compared with Fig. 2;

Fig. 12 is the circuit diagram of the router of Fig. 1;

Fig. 13 is the circuit diagram of the sorter and register of Fig. 1; and

Figure 14:
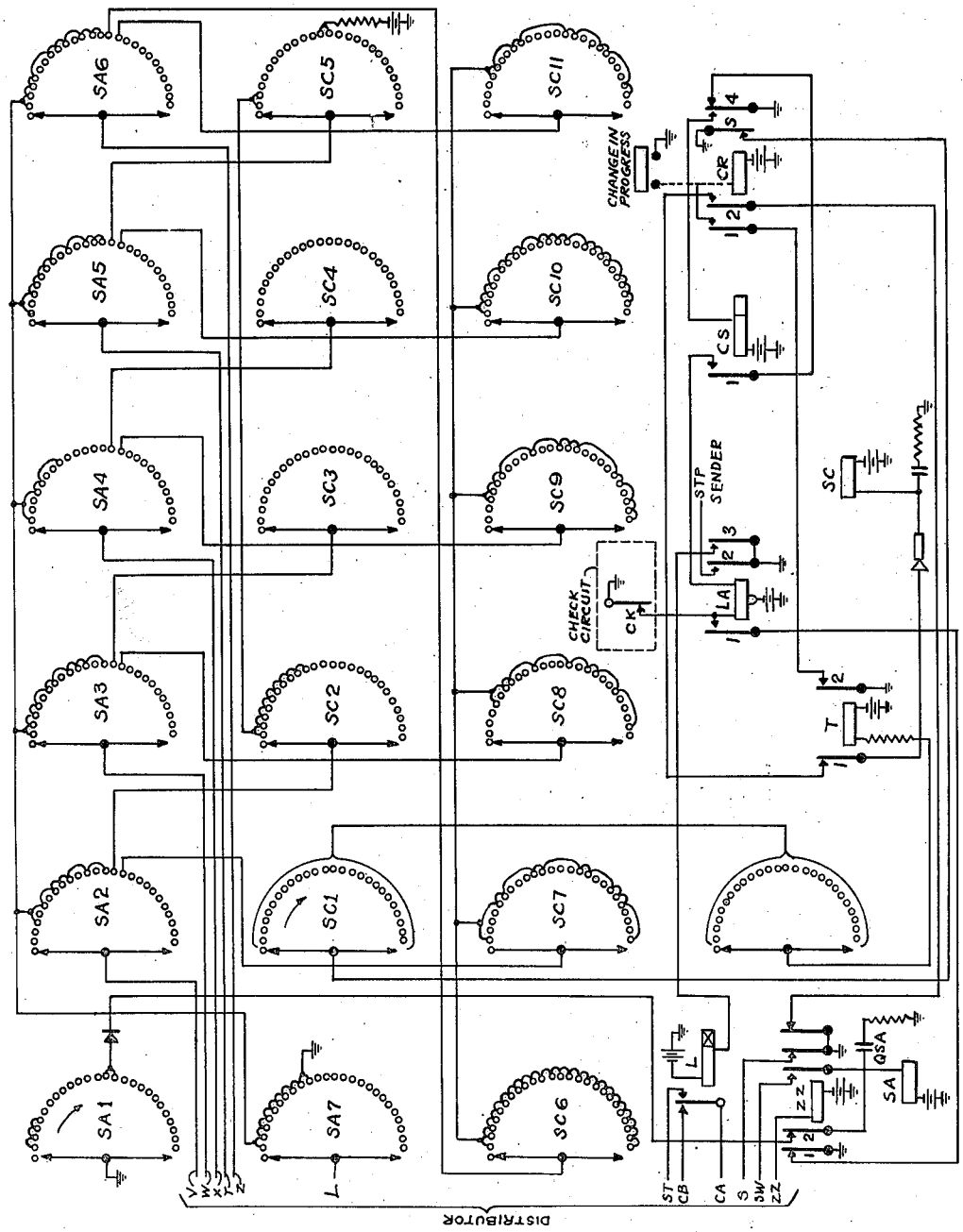

Fig. 14 is the circuit diagram of a further modification of Fig. 2.

Referring to Fig. 1, this illustrates the basic requirements for signalling from either of two locations to the other, the received information being recorded on a printer.

Upon the occurrence in a source at one location of an event that is to be notified to the other location, that source puts through a calling condition to the distributor with which it is associated, while at the same time storing the necessary information in itself as a telegraph code marking. When the distributor responds, and connects that source through to the sender, the stored marking is passed over to the sender and is there translated into a signal sequence for application to the telegraph signalling equipment, which repeats the signal to the line after transforming it into, say voice-frequency.

Incoming signals go through the telegraph signalling equipment, and thence, on the one hand to a printer of known kind, and on the other hand to the receiver, where each character of the sequence code is translated into an individual marking to a router.

As a consequence of this marking the router either:

(a) Connects the incoming channel to the appropriate outgoing channel, or (b) Routes the output of the receiver and of the telegraph signal to the sorter.

The sorter, on receipt of the marking, functions, either:

(a) To route the signals from the telegraph signalling equipment to other printers, or to a display printer, or (b) To route the receiver output to appropriate registers in which the following signals are either displayed or used to effect operations.

THE SOURCE (FIG. 2)

*Summary*

When the circuit-breaker changes, the "in/out" contacts in the bottom right-hand corner are changed over, and a calling signal is sent to the distributor and sender over lead ST. When the sender is ready to receive, earth is sent back on lead ZZ to operate relay ZZ and initiate sending of the message from the source to the sender. The characters are sent in teleprinter code on the five leads V, W, X, Y, Z, and the letters or figures indication is given by the presence or absence of battery on the lead L.

It will be assumed in what follows that the message consists of the characters ABC YORK D F 123 IN or OUT. The sending involves stepping of switch SA; and the following table gives the significance of the several switch positions:

| | | |
|---|---|---|
| 1 | A | |
| 2 | B | |
| 3 | C | |
| 4 | space | |
| 5 | Y | |
| 6 | O | Letters indicated by battery on the L lead over sa7. |
| 7 | R | |
| 8 | K | |
| 9 | space | |
| 10 | D | |
| 11 | space | |
| 12 | F | |
| 13 | space | |
| 14 | 1 | |
| 15 | 2 | Figures indicated by no-battery on the L lead. |
| 16 | 3 | |
| 17 | space | |
| 18 | space | |
| 19 | circuit breaker condition | |
| 20 | end of message signal | |

*Detailed description*

Let it be supposed that in the substation under consideration a certain circuit-breaker, namely that controlling the "in/out" contacts seen at the bottom right-hand corner of Fig. 2 and occupying position No. 19 in the contact bank of switch SA, is at a certain time "in." Then the "in/out" contacts will occupy the position shown, while the mechanically or magnetically locking relay M will be in that of its two positions such that its contacts $m1$ are down as shown. Let it now be supposed that that circuit breaker cuts out. The "in/out" contacts will change over, and the subsequent operations, presented as far as possible in tabular fashion, will be as follows, the reference being to relays except where otherwise specified:

Contacts "out" close.
LA operates: $zz5$, "out" contacts, $m1$, LA,
  and locks: $zz1$, $la1$ up.
M changes over: $zz5$, "out" contacts, $la5$ up,
  right-hand winding of M.
L operates: $la3$ up.

Thus a call is made to the distributor by the connection of lead CA to ST instead of to CB.

The reply that comes back from the distributor consists of an earth on the Z lead, so that ZZ operates.
LA releases: at $zz1$ up.
L releases: at $la3$ up.

Thus the calling signal terminates.

The opening of contacts $zz5$ will prevent any further change in the circuit-breaker from interfering with the sending that is about to occur.

The switch magnet SA is energised over the SW lead and $zz3$ up; while its homing circuit is opened at $zz2$ up.

The first character "A" is sent over the five leads V, W, X, Y, Z, through the distributor to the sender, accompanied by a "letters" signal on the L lead.

The sender on receiving the first character removes earth from the SW lead so that SA de-energises and stops to position 2.

The letter "B" is sent.

Similarly for the successive letters (and spaces) up to the thirteenth position of the switch, and then for the figures in the fourteenth to sixteenth positions, with no battery now on the L lead.

Finally in the nineteenth position the present "out" condition of the circuit-breaker is sent by battery on the W lead.

In the twentieth position of the switch there is no battery on any lead: this constitutes an "end of message" signal, so that under the control of the sender ZZ releases
  Switch SA homes, $sa1$, SA$dm$, $zz2$ The relay M remains locked in the position it now occupies, and with contacts $zz5$ back the equipment is ready to deal with another changeover.

Figure 3:
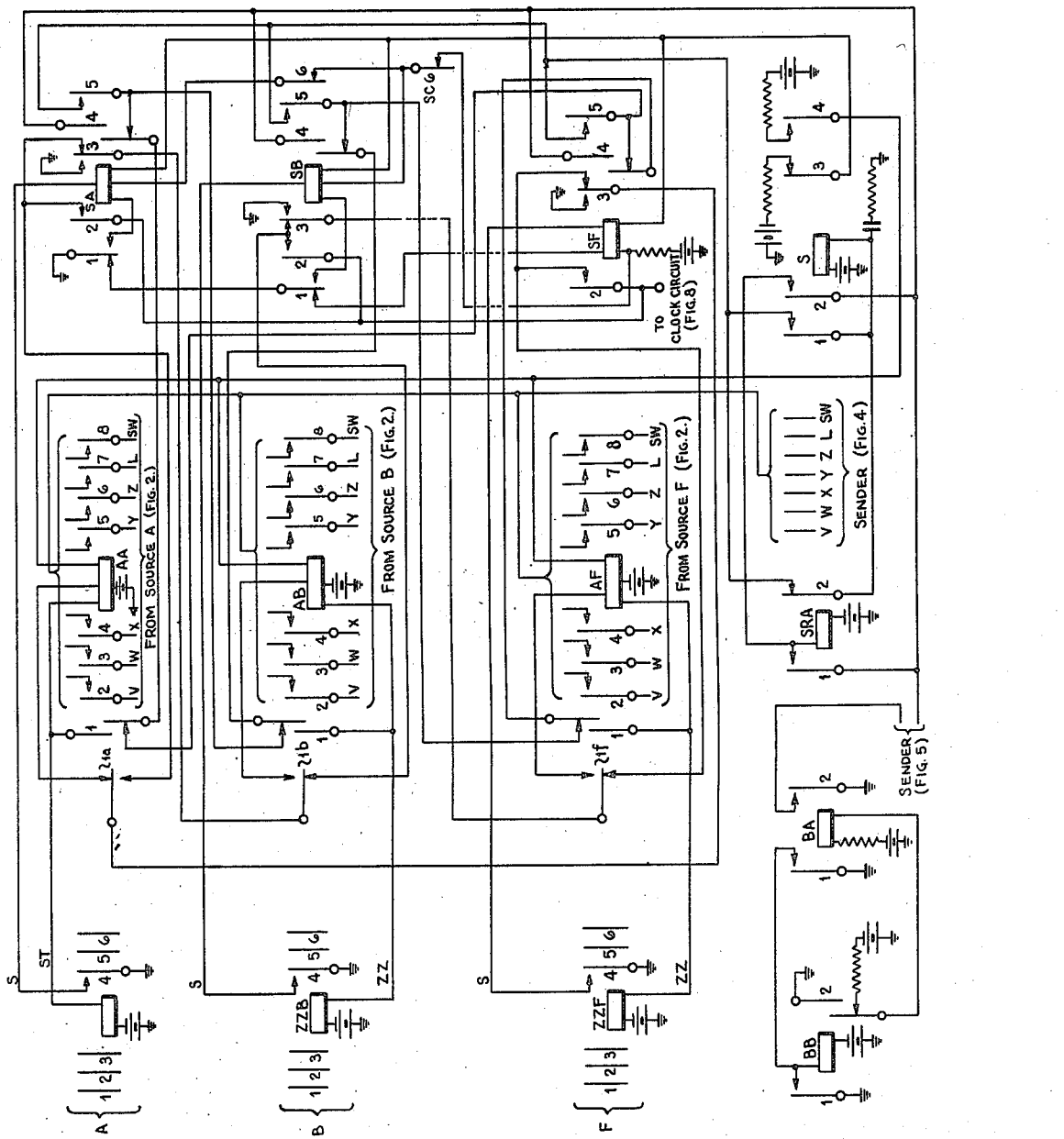
Fig. 3 is the circuit diagram of the distributor of Fig. 1.
Figure 4:
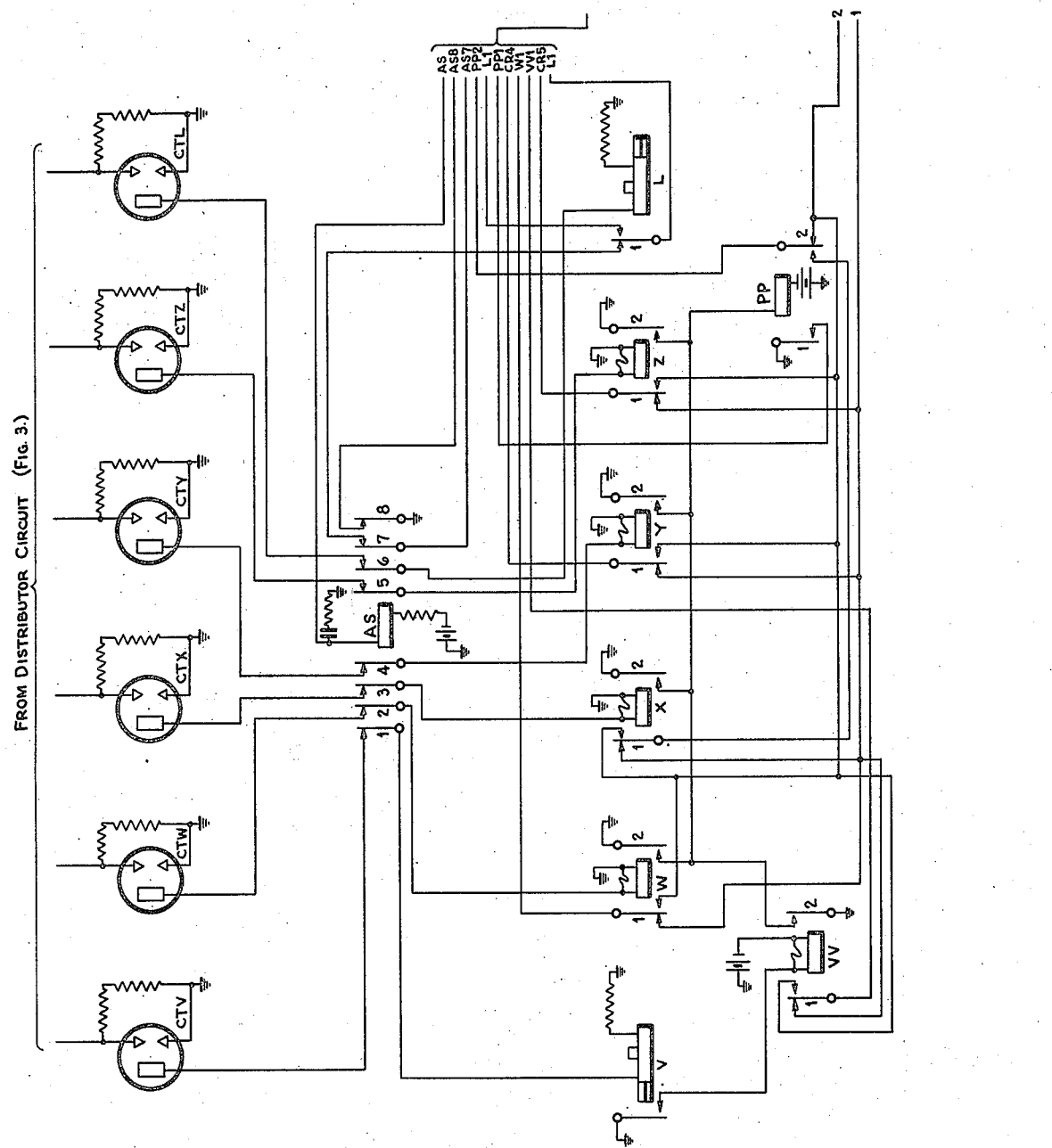

The Distributor (Fig. 3)

Summary

One sender circuit is common to a number of sources and is to be made available to them one at a time. The function of the distributor is to determine the order in which those sources having messages stored ready to send shall be connected to the sender; no source having two consecutive connections unless no other traffic is waiting. This arrangement ensures that during periods of heavy traffic an even flow of messages is maintained from the sources to the sender, and that no message is held up for a longer period than is necessary to transmit one message from every other source.

It is supposed that there are six sources, A, B . . ., F, associated with the one sender, but in Fig. 3 only the circuits pertaining to the first, second, and last of these have been shown, it being understood that the other circuits are exactly similar. (It may here be noted that for consistency the four contacts of relay SF that have been shown are numbered 2, 3, 4, 5, to correspond with relays SA—SE. Contacts $sf1$ do not exist: contacts $sf6$ exist but are not shown.)

On the left-hand side of the drawing are shown the leads CA, ST, ZZ, CB, S that come from the sources already described with reference to Fig. 2. In the middle are the leads V, W, X, Y, Z, L, SW from the same sources: these are taken down through the distributor to the sender circuit indicated at the bottom of the drawing. References previously used in Fig. 2 and now used in describing Fig. 3 may have the designations A, B, . . . F added to distinguish the several sources.

The sources are given the opportunity of sending in a stored cyclic order, viz. A, B, C, D, E, F, A, as determined by the closed loop formed by contacts $sf3$, $l1f$, . . . $sb3$, $l1b$, $sa3$, $l1a$, $sf3$. This closed loop is arranged to give a variable point of entry to the relays AA, Ab, . . . AF, the point of entry being associated with the next source after that from which the last message was transmitted.

Detailed description

When power is switched on,
BA operates;
BB operates; $ba1$ up, and locks up so long as the power supply is maintained,
BA releases: shorted by $bb2$
BR operates in the sender circuit and locks.
SF operates: $sa1$, $sb1$, . . . $se1$, SF.
S operates: from the sender circuit over lead B, $sf4$ up, $af1$, . . ., $sb4$, $ab1$, $sa4$, $aa1$, $sf5$ up, $sra2$, S.
SRA operates: lead B, $s2$ up, SRA.
  and locks: lead B, $sra1$ up.

Thus relay S prepares a circuit for relays AA, AB, . . . AF at $s4$ up, and opens the operating circuit for relays SA, SB, . . . SE, at $s3$ up.

Now source B wishes to transmit, that is to say its relay L has operated, thus changing-over contacts $l1b$.

AB operates: $sf3$ up, $l1a$, $sa3$, $l1b$ up, AB, $s4$ up
and locks: AB, $ab1$ up, $sb4$, . . ., $af1$, $3f4$ up, lead B.
sending earth back over lead ZZ from its own locking circuit, so that at the source
ZZB operates:
S releases: at $ab1$ up (but SRA holds).
Relay AB switches the leads V, W, X, Y, Z, L, SW from the source, through to the sender.
SB operates: $zz4f$ up, SB, $s3$
and locks: $sa1$, $sb1$ up, SB, $sc6$,
SF releases: at $sb1$ up.
SB locks: $sa1$, $sb1$ up, SB, $sc6$, $sf6$, YA.

Upon completion of the transmission from source B to the sender, the sender removes earth from the B-lead, so that relays SRA, AB, and ZZ$b$ release. The distributor is now restored to normal, but with SB up instead of SF, giving first choice to source C.

The Sender (Figs. 4 to 7)

Summary

The signal on the six leads V, W, X, Y, Z, L from the source is passed to six relays V, . . . Z, L via cold cathode tubes CTV, . . ., CTL (Fig. 4), and from there is passed out to line L (Fig. 7) as normal time-consecutive teleprinter signals. This translation makes use of a time-base circuit consisting of a pendulum relay P and associated relays A, ..., H (Fig. 5). The control of the sending of the successive characters is effected by the set of relays ZA, ..., ZK (Fig. 5). In Fig. 6 is shown the connection between the five marked leads b, ..., f in Fig. 5, and the two leads M and S to windings of the telegraph relay SR in Fig. 7.

A "Call waiting" indication is given to the sender circuit by the release of the CW relay in that circuit (Fig. 5) following the operation of any one or more of the L relays associated with the sources. In the case when SB (Fig. 3) is held operated, the operate circuit for CW is via sb3 up, ..., llf, sf3, lla, sa3, llb, sb2 up, to the CWD lead to the clock circuit and thence via the CWS lead to the sender circuit.

Detailed Description

Normal condition

BR is up: pc2, br1 up, BR.
Leads BR and B are earthed: pc2, br1 up; br3 up.
Pendulum relay P is held energised so that p1 are closed and p2 open: br4 up.
Telegraph type relay SR is held on "mark": br6 up.
but is prepared for change-over to "space": br7 up.
CW is up, releasing only when any source is held waiting to transmit.
AS is up: cw1 up, pc4, AS.
The operate circuits of relays V, W, X, Y, Z, L, FF, are held disconnected by contacts as1 up, ... as7 up.
Condenser QST (Fig. 7) is charged.

Call initiated by a source

When a change-over occurs in a source as already described, relay LA operates (Fig. 2), and earths lead STP over contacts la2 up; so that in the sender (Fig. 5) relay STP operates. This causes relay SR (Fig. 7) to operate to its space side for the time that it takes for condenser QST to discharge, some twenty milliseconds; and during this time a "start pulse" is sent out to line. Upon receipt of this start pulse, the teleprinters at the receiving location are started in preparation for the receipt of the message. At the same time relays CW and AS (Fig. 5) release in the sender; so that when the distributor connects the source through the sender, the first character will be marked for transmission by a selective operation of relays V (and VV), W, X, Y, Z. Those relays that operate will be those corresponding to the "space" elements of the character, and they will prepare circuits over their contacts vv1, ..., z1 (Fig. 6) from a selection of the five leads b, c, d, e, f, to the (S) lead for the transmission a little while later of the space elements of the character.

PP operates: any of vv2, ... z2 up
PC operates: pp1 up
BR releases: at pc2 up
PCR operates: pc5 up
 and locks: ga1, pcr1 up.
FF or LL operates, indicating figures or letters: pc5 up, l1, as7, FF or pc5 up, l1 up LL.

Figure shift or letter shift is prepared for the M and S leads by the closure of contacts pcr3, pcr4, pcr5, pcr6 to the mark lead M from the four leads b, c, e, f, and by the closure of either ff3 to the space lead S or of ll3 to the mark lead M from the d lead.

The time base circuit (Fig. 5)

The transmission of the successive elements of the character in teleprinter code is controlled by the time-base circuit consisting of the pendulum relay P and the set of relays A, B, C, D, E, F (and FR), G (and GR), H. The operation of this circuit is initiated by the release of relay BR, so that pendulum relay P, being no longer held energised over br4, commences to oscillate.

Then

1st release of P:
 A operates: p2, h1, f1, d1, b1, A, (S), MRF, SR, BRA, so that a space condition is applied to the line at sr1.

1st re-operation of P:
 B operates: p1 up, e1, c1, a1 up, B, to lead b, and A releases: at p2 up.

2nd release of P:
 C operates: p2, h1, f1, d1, b1 up, C, to lead c, and so on until a complete character has been sent consisting of 1 space as "start."
5 elements, mark or space as determined by the connections between the five leads b, c, d, e, f and the leads M and S.
1 long mark as "stop."

Thus, for the transmission of "figure shift," the SR relay applies "mark" and "space" conditions to the line in the order: space—mark—mark—space—mark—mark—mark—mark. Of the eight elements, the first one and the last two are fixed but each of the five intermediate ones will be "mark" or "space" according to the particular character being transmitted. If the initial character had been a letter, L would have operated and separated LL instead of FF and the five intermediate elements would have all been "marks" and a "letter shift" would have been transmitted.

Toward the end of the sending of this letter shift signal, when relay GR operates, then GA operates: gr2 up.
CR and CRR operate: pc3 up, sh1, ga3 up.
PC locks: ga1 up, pc1 up.
CR and CRR will lock over crr1, ga3, when relay GA releases.

Thus, after sending the letter shift signal, the equipment will be ready for sending the first message character "A," being conditioned by having CR and CRR locked up.

(Note that the SA switch in the source (Fig. 2) is not stepped during the transmission of this initial "figure shift" owing to the circuit for the energisation of its magnet over gr2 and crr3 to the SW lead not being completed until GR releases. This same arrangement applies during the transmission of any "shift" condition.)

The train of operations of A, B, C, etc., is now repeated and since, in this case, CR is held operated, the initial character is transmitted; the five elements being "space" or "mark" according to whether or not the respective relays VV, W, X, Y, Z are operated. During this operation the SA switch magnet is held energised to earth via gr2 and crr3 up. This circuit is released and SA steps when GR operates at the end of the train of operations.

When FR (Fig. 5) operates during the train of operations of A, B, C, etc., AS operates: fr1 up, gr1, crr2 up, to disconnect momentarily the hold circuits of relays VV, W, X, Y and Z, in order that the correct combination of these relays may be operated when the SA switch is on its next contact. AS is released when GR operates.

The succeeding characters being letters, CR and CRR remain operated because no operate circuit is completed for SH. The characters are transmitted as above but without being preceded by a "shift" condition in each case. The SA switch steps at each operation of GR and AS operates at each operation of FR.

When the characters change from letters to figures a "figure shift" is interposed before the figures are transmitted. In this case SH operates in parallel with FF: pc5 up, l1, as1, ll1, SH; while relay FF opens the locking circuit of LL at ff2, and closes its own locking circuit over ll2. Relay SH releases relays CR and CRR, and itself releases when GA has released.

With CR released, a "figure shift" is transmitted in a similar manner to the transmission of a "letter shift." A "shift" condition occurs at every change from figures to letters and vice versa and the appropriate "shift" is transmitted before the associated character is transmitted and the switch stepped.

End of message signal

At the end of each message a predetermined combination of eleven characters is sent viz—
Figures
Full-stop
Six spaces (omitted during heavy traffic periods)
Carriage return
Line feed
Space When all the stored characters have been transmitted, GR operates to step the SA switch on to a contact from which no marking is connected to the sender. All the relays VV, W, X, Y, Z are released and PP releases. GR, as before, operates GA and releases AS. PC is held via ga1 up and pc1 up. PCR is held via pc5 up. If the last character is a figure FF remains operated and SH does not operate but if the last character is a letter LL releases and FF and SH operate. In the first case when GA releases, PC releases, but CR and CRR are held operated. In the second case when GA releases, PC and SH release, CR and CRR being previously released by the operation of SH. PCR is now held to earth via ga1, pcr1 up. FF is held to earth via ga1, pcr1 up, ff2 up, ll2.

During the subsequent train of operations of A, B, C, etc., the "figure shift" is transmitted, in one case the marking on the b, c, d, e, and f leads being via front contacts of relay CR, in the other case via back contacts of CR and front contacts of PCR.

When GA operates towards the end of the train of operations, those of the relays FF, PCR, CR and CRR which are operated now become released.

The marking for the ten remaining characters is given by the successive operation of the ten relays ZA, . . ., ZK (Fig. 5). Thus when relays PCR and BR have released, relay ZA operates: pcr2, fra1, br2, chain zk2 . . . zb2, ZA. Near the end of the sending of the character thus marked, viz. when relays F and FR operate, bringing up FRA, a circuit is established for relay ZB: pcr2, fra1 up, za1 up, cw2 up, ZB left-hand-winding, ZA; but when FRA releases, then ZA is released, and ZB holds on its right-hand winding. Thus each time FRA operates one of the relays operates and the preceding one holds but when FRA releases the preceding relay is released and the required relay holds and ensures that only its associated character elements are avaliable for transmission.

CW is normally operated in which case each of the relays ZA—ZK is operated in succession but during periods of heavy traffic CW is released and the operate circuits of ZB—ZG inclusive are omitted from the train.

When the clock circuit is associated with the sender and it is required to include the time, the End of Message signal becomes:

Figures
Full-stop
£
Tens of minutes
Units of minutes
Three spaces
Carriage return
Line feed
Space The operation of RT provides the "start" condition to the clock circuit for the inclusion of the time.

As previously, during periods of heavy traffic, characters 3 to 8 inclusive of the End of Message signal are omitted.

BR operates when FRA operates for the 10th time. BR holds, the pendulum relay P is held energised and the circuit is restored to normal.

CLOCK CIRCUIT (FIGS. 8 AND 9)

Summary

Switch SU is stepped once every minute, and switch ST once every ten minutes. When an indication of the time is called for from the sender over the HT lead, the present position of the SU switch is registered by a selective operation of relays UV, . . ., UZ, and similarly for the ST switch on relays TV, . . ., TZ. These indications via relays VU, . . ., ZT, are passed back to the sender over the leads BF, . . ., SP at the top of Fig. 8.

The clock circuit is designed to introduce a record of the time into the End of Message signal once every one-minute period during light traffic conditions; this information being given in the form of the £ character followed by two characters denoting respectively the tens and units of minutes past the hour. These characters correspond to the 3rd, 4th and 5th characters respectively of the End of Message signal.

During periods of heavy traffic, characters 3 to 8 inclusive are omitted from the End of Message signal and, therefore, no record of the time is transmitted; such is also the case when the "on" key is left unoperated.

If, during transmission of the time characters, either the "on" key is restored to normal or other sources await transmission of their stored messages, the record of the time is completed but characters 7 and 8 of the End of Message signal are omitted.

The HT and PT relays are equipped at the ratio of one of each per sender while the remainder of the apparatus is common to a group of six senders.

The SU switch is used to provide the character marking associated with the units 0.–9 and the ST switch is used similarly in the case of the tens 0.–5. The strapping on the SU and ST marking banks is multipled to give 5 and 4 appearances respectively of the marking associated with each digit. Lamp indication is given of the time corresponding to the contacts on which the switches are standing, the units lamps being used on association with the contacts on SU banks 1—2 and the tens lamps being used with ST bank 6. Keys are provided to step or run the switches as desired in order that the lamp indication may be aligned to correspond with the correct time.

*Detailed description*

With the key ON thereon, relay BR is operative, so that the relay HM will operate momentarily to every half-minute pulse. Contacts br2 will prevent manual operation of HM over the pulse key PK, and will provide a locking circuit for BR, making it independent of the "on" key, subject to operation of either CO or DTU. Over its contacts br3, the relay BR completes the circuit from the distributor to the sender: similarly the other contacts br4, . . ., br8, (not shown) serve to connect the other five distributors with their individual senders.

The successive operations and releasings of HM cause a cyclic operation of the relay pair HA and HB as follows:

1st operation: HA operates; hm1 up, hb1.
1st release: HB operates; hm1 up, HB HA.
2nd operation: HA releases, HB holds; hm1 up, hb1 up.
2nd release: HB releases.
3rd operation: HA operates as for the first operation, and so on.

This cyclic operation, taking place over a time of one minute and involving the operation of relay HB once per cycle, is utilised to step the units-minutes switch SU over contacts hm3 and hb5 once per minute. On each tenth step, the relay STR is operated, and the tens-minutes switch ST is energised over contacts hm4, hb3, str1, stepping once upon de-energisation.

During the End of Message signal transmitted by any one of the senders, its relay RT operates and completes the circuit to its associated HT relay in the clock circuit provided that its CW relay has not previously released due to there being a period of heavy traffic. If the corresponding relay PT is unoperated and there is no other circuit for operating or holding CO, the relay DTU operates: ht1 up, pt2, co1; followed by DTT. DTU and DTT provide for the operation of relays UV, UW, UY, UZ, TV, TW, TY and TZ which operate relays VU, WU, YU, ZU, VT, WT, YT and ZT respectively. The disconnection of the operate circuit of relays XU and XT at dtu8 ensures that these relays remain unoperated even when relays UX and TX are operated from the marking banks of the SU and ST switches respectively under these conditions. The operation of relays VU, . . ., ZT together with the non-operation of relays XU, XT and COR, combined with the operation of relays ZB, ZC and ZD in the sender circuit fixes the 3rd, 4th and 5th characters of the End of Message signal as spaces. During the transmission of these particular characters and also of the 6th character (a space) of the End of Message signal the CW relay is held operated over ht5 and br3 (or other corresponding BR contacts). If the circuit for CW is now released by the release of HT, the 7th and 8th characters (both spaces) are omitted from the End of Message signal. This occurs when one or more storage units become filled during the transmission of the time signal and the normal operate circuit for CW via the distributor circuits is released. Should relay PT operate during the transmission of the first four space characters a circuit is provided for holding DTU over ht1 up, pt2 up, dtu5 up, co1 in order that this transmission may be completed correctly.

Consider now the case with all the HT relays released, and all the PT relays locked operative (as a result of a time pulse on HM: hb2, hm5 up, ht3). Let one of the HT relays now operate:

HT operates: from the sender circuit (relay RT).
CO operates: ht1 up, pt2 up.
PT releases: ht4 up and co7 up.
CO holds: ht1 up, pt2, co1 up.
COR operates and changes the marking on the BF lead to cause sending of the character £.
HT releases: under control of the sender.
CO releases.
HT re-operates.
A selection of relays UV, . . ., UZ operates: co5, ht2 up wipers and banks of switch SU.
A similar selection of relays TV, . . ., TZ operates.
CO operates.
The selections lock: co5 up.
Corresponding selections VU, . . ., ZU and VT, . . ., ZT operate: br2 up, co6 up.

These latter selections, in conjunction with successively operated relays ZC and ZD in the sender circuit, effect the transmission of the units and tens of minutes respectively.

Further HT relays may operate and hold CO, but CO will release as soon as there is a period with no HT relays operated. The PT relays associated with those HT relays which have operated will have been released. Should any one of the HT relays operate a second time during the one-minute period when CO is released, DTU operates and space characters are transmitted instead of the time signal characters.

If when the particular HT relay operated, HB was operated together with HM operated or HA released, a circuit would have been completed for DTU to operate and CO to be short-circuited and to remain unoperated. Space characters would be transmitted as previously described in place of the time signal. The operate circuit for DTU would be via ht1 up, pt2 up, hb4 up, hm2 up (or ha2), co1. This occurs during the period when the SU and ST switches are energised and stepping and ensures that a time signal is not transmitted during a period of change of time.

The PT relay circuit is so arranged that with CO and HB back and HM up there is an operate circuit for each of the PT relays, each relay locking over pt1 up. In the case when CO is operated and other conditions are as above, similar circuits are provided for those PT relays whose corresponding HT relays are unoperated. With the corresponding HT relays operated provision is already made for the transmission of the time signal when CO is operated. The DTU and CO relay circuits are arranged so that space characters and time signal characters respectively may be transmitted according to the conditions of the HT and PT relays. If, at the time when HM is operated and HB is unoperated to certain of the HT relays, transmission of the time signal will be effective from the corresponding sender circuits and CO will hold until there is a period with no HT relays operated. CO will re-operate and the time signal will be transmitted if any of the remaining HT relays operate because their corresponding PT relays have operated as shown above. These PT relays will release; their hold circuits being disconnected by the operation of CO and their corresponding HT relays. All the PT relays are released in the same manner under similar conditions and with CO unoperated, further operations of any of the HT relays cause the operation of DTU and the transmission of space characters in place of the time signal characters.

RECEIVER CIRCUIT (FIG. 10)

*General*

The receiver circuit is designed to record teleprinter code line signals on relays, and to translate the 5 unit character code into protential on one of 32 wires.

The receiver is required to inspect each of the 5 elements defining a character and to record if these are mark or space. Signals are received by the line relay R. The inspection period is 2 milliseconds provided by the operated conditions of a condenser-controlled high-speed relay HA. If any of the 5 elements is space this is recorded by the operation of the corresponding relay V, W, X, Y, Z.

The method of placing the inspection period (HA operated) in the centre of the signal elements is to use a 25 C. P. S. pendulum relay PB as a time base. If the circuit is at rest PB is held energised so that contacts pb2 are made and pb1 are open. When the pendulum is oscillating HA operates as the contacts change-over at the midpoint of each swing. When R moves to space at the beginning of a start signal an accurate time delay circuit is provided to open the circuit of PB and cause this relay to vibrate. HA will operate on the mid-point of each half-cycle. Provided its operate period is symmetrically placed in the first element by the delay circuit the free vibration of the pendulum will ensure that it is central on subsequent elements.

Considering the requirements in more detail. The initial operation of R to space opens the circuit of a condenser controlled relay PA. Contacts pa3 opens the circuit of PB which will then vibrate freely during reception of the character. It may be mentioned here that whereas the release of PA is controlled by contacts r1 back of R the circuit for recording the space-elements is over r1 front and in considering the effective centre point of elements in the receiver the transit time of R must be taken into account. If this transit time is 1 millisecond and the first signal element is space the effective center point of that element will be 31 milliseconds after R leaves its mark contact. If HA is up for 2 milliseconds which is to be in the center of the element HA must close its front contact at 30 milliseconds. HA takes 1 millisecond to operate in the circuit used and therefore PB must reach the mid-point of its first half cycle at 29 milliseconds. The combined release time of PA and PB to that midpoint must therefore be as near as possible to 29 milliseconds. If this initial displacement is correct and the speed of PB is accurate the inspection period on other elements will also be correctly placed.

The pendulum relay PB having been released at the beginning of a character vibrates freely for 3 cycles. The counting relays B, C, D, E, F, and K count half cycles and operate at approximately 40, 60, 80, 100 and 120 milliseconds from the beginning of the character. These counting relays close operating circuits to relay W, X, Y and Z on the 2nd, 3rd, 4th and 5th elements. F provides a circuit to re-operate PB ready for the next character.

*Detailed description*

When power is connected to the circuit:

PA operates: to power
 and locks: pa1 up, r1
PB operates: f1, a1, pa3, PB lower winding.
AG operates: pb2 up, MRB, d2, b2, AG.

The upper winding of PB is in parallel with AG: this upper winding is in opposition to the main (lower) winding, and stabilises the release time of PB when the main winding is disconnected.

When a start signal is received over the line onto relay R, which moves over the space, changing over contacts r1 and releasing relay PA slowly, PA is connected in parallel with a condenser QG, the value of which has been set to give a suitably release time. The combination gives a release time which is almost independent of voltage variations and relay adjutment.

A operates: f1, pa2, ag1 up, a left-hand winding,
and locks: f1, a1 up, a right-hand, a left-hand winding.
PB releases: at pa3.

When contacts pb2 were closed, the condenser QF was charged with positive on its lower tag. Now, when PB passes through the mid-point of its first half-cycle, so that pb2 opens and pb1 closes, the charge on the condenser QF is reversed through relay HA, causing HA to operate in about 1 millisecond and remain up for 2 milliseconds. Since the circuit of HA is symmetrical, such operations, due to reversal of charge on QF, will occur each time PB passes through its midpoint in either direction. Rectifiers MRA, MRB prevent earth fed back from relays B—F from shunting out HA.

PA operates: a2 up and stays up throughout the reception of the characters: but the circuit of PB remains open at a1 up, and so PB continues to vibrate freely.

When contacts pb1 make for the first time, relay B operates and locks, so that at contacts b3 the inspection circuit is transferred from V to W.

When, in the next half-cycle of PB, contacts pb2 make, relay C operates and locks, transferring the inspection circuit now from W to X: and so on, during the successive half-cycles, the relays D, E and finally F and K are operated.

From the beginning of the start signal, relays B, C, D, E, F (K) receive circuits at 29, 49, 69, 89, 109 milliseconds respectively and the relays operate at about 40, 60, 80, 100 and 120 milliseconds. Relays B, C, D and E therefore select the 2nd, 3rd, 4th and 5th signal elements respectively. Relays F and K receive their circuit when the pendulum is releasing and their operation corresponds to the end of the 5th signal element, this is the beginning of the stop signal. Relay F provides a circuit which operates PB on its lower winding so that it ceases to vibrate and also opens the circuit of A which releases. K locks and at k3 releases relays B to E. When B and D release AG operates and releases K. Relay F released when pb1 opened and the circuit remains with PA, PB and AG energised for the next character.

Identification and translation of character

From the above description it will be seen that HA prepares a circuit for relays V, W, X, Y, Z on the first, second, third, fourth, fifth elements respectively. On all except the first element the circuit is completed by one of the counting relays B to E. If during any of these elements the R relay is on space, earth will be connected to the appropriate relay and will charge the associated condenser QA, QB, QC, QD, QE. The condenser then discharges through the left-hand winding of the relay which makes its contact and operates fully on its right-hand winding. If the first element is a space, VV operates in series with the locking winding of V. It should be noted that, although a relay such as X will operate fully in response to a pulse on HA as short as ½ millisecond, yet its total operating time will be of the order of 15–18 milliseconds. If the signal is one in which all elements are space, relays V to Z will therefore operate at approximately 45, 65, 85, 105 and 125 milliseconds from the beginning of the start signal.

The received character is identified by the selection of relays V to Z that is operative. The identification relays are in two groups V, W, X, and Z, Y; and the translation of the code is extended over contacts of V, W, X to eight relays SA, . . ., SH. Each of the relays SA to SH has four contacts connected to leads CA to CD. One of the latter leads is selected by contacts of Y and Z. The selection of one relay SA to SG and one lead CA to CD enables one of 32 terminals to the sorter to be selected by any character. Relays in the group V, W, X, are released earlier than Z, Y since their combination has been recorded by the operation of relays SA to SH and the beginning of a fresh character can therefore be recorded on these relays even though Z and Y have not released from the previous character.

Relays V to Z lock over $a3$ to earth on $k3$. When D operates a circuit is closed for TR and TS which operate. Contacts $tr1$ extend earth to operate one of the relays SA to SH, while $ta1$ holds V to Z. When contacts $e1$ open, TR and TS release and the resistance in parallel ensures that their contacts are closed for at least 25 milliseconds. Relays V, W, Z release when $ts1$ opens.

Relays T and Z when they operate lock to $c4$, but the circuit is maintained by $k3$ up so that these relays do not release until after K. Contacts $k4$ prepare a circuit for energising the 32 discriminating wires, this circuit being completed by $pb2$ in order to ensure that Z can operate before earth is applied to $z2$.

Modified source for indicating transient occurrence (Fig. 11)

The circuit shown in Fig. 2 pertained to equipment such as circuit-breakers that would be in either of two positions, thus determining the position of the "in/out" contacts as described. Fig. 11 shows a modification of that part of Fig. 2 enclosed in a dotted line, suited to the case where the occurrence to be indicated is one that is but momentary. The references correspond exactly, and the functioning is very similar. It may be noted that contacts $za5$, in releasing, close a circuit over $za4$ and $m1$ to reset relay M, whose function is to register the transient until it has been signalled.

The router (Fig. 12)

Intermediate between the receiver and the sorter, the router is controlled by the former.

For simplicity consider the case where the destination is indicated by three digits each of which may be one of the four letters A, B, C, D: then the sixty-four possible destinations will run from AAA to DDD.

Pertaining to the first digit there will be a group of four relays A, B, C, D, and a common relay X, the four leads being taken to the corresponding relays over normally closed $x$ contacts.

Pertaining to the second digit there will be a group of sixteen relays AA, . . . DD, and a common relay Y. The group of sixteen will be divided into four sub-groups, one for each lead: 1. AA, . . ., DA; . . ., 4. AD, . . ., DD. These sub-groups will be reached in their respective leads over normally-open $x$ contacts, normally closed $y$ contacts, and individual normally-open $a$, $b$, $c$, or $d$ contacts.

Finally, for the third digit there is a group of sixty-four relays, AAA, . . ., DDD; in four sub-groups AAA, . . ., DDA; . . .; AAD, . . ., DDD; one on each lead; each sub-group being reached from the lead over normally-open $y$ contacts, and individual normally-open contacts $aa$, $ba$, $ca$, $da$, $ab$, . . ., $dd$.

Considering now the circuit shown in Fig. 12 in the light of this explanation, and assuming that the three-letter destination-signal is "ABC"; then on the connection of earth from the receiver via wire A, relay RA operates; and on removal of earth, relay SA operates in RA's locking circuit via $ra1$. Contacts $sa2$ operate relay X, which disconnects the operating circuits of all relays such as RA and closes those of the second-digit relays.

If the second letter is B, earth via this wire from the receiver will operate relay RAB and on the removal of this earth SAB will operate, in turn operating relay Y which disconnects the operating circuits of the second-digit relays and closes those of the third-digit relays.

If the third letter is C, earth via this wire from the receiver will operate relay RABC and on the removal of this earth SABC will operate at SAB2 operating Z which disconnects the operating circuits of the third-digit relays. Relay SABC closes a circuit whereby the next letter shift signal will be routed to the sorter. This feature is included to allow the suppression of characters if required, those between the third-digit and the shift signal being ineffective.

By a similar procedure relay SADF, operating to the first three letters ADF, would connect the incoming channel to a particular outgoing channel.

At the top of the drawing is shown a network of contacts of the digit-relays. The function of this is to lock out the router for unsortable messages.

The closure of contacts $k1$ in the receiver unless the receiver extends on earth to operate one in each of the groups of digit relays, operates relay LO which locks, opening the locking circuits of all the digit-relays RA, . . .; RAA, . . .; RAAA, . . ., and so preventing any S relay from operating. Where a particular R relay is not equipped its contact in the chain is omitted, the chain being wired through.

Line Feed, being an unique ending signal, is used to operate relay LF and reset the router.

The sorter and register (Fig. 13)

The function of the sorter is by discrimination on the descriptive characters received to allocate the indicating or controlling characters to the appropriate register. A register comprises means to retain the relevant information contained in appropriate incoming signals and to effect a consequent function. A two-position register is shown in Fig. 13.

To clarify printed records, rather fuller description than required for actual discrimination can be employed. To exemplify this a two-position signal is considered, the actual signal being:

ABC YORK D F 123 + when + = "in," − = "out"

ABC are routing characters and the remainder might represent DC feeder No. 123 at York, the relation between this and the signal being evident.

A, B, C having been dealt with by the sorter the following space is sent as a figure. This ensures that the Y is preceded by a letter shift.

To the letter shift signal first 1A and then 1B relay operates. Contacts 1b1 close a similar lockout network as in the router. (Contacts k1 now being open, relay LO will not operate.)

To the next signal, Y, first 2A and then 2B relay operates. If any other character had been received LO would have operated.

To the next signal, O, first 3A and then 3B relay operates. If any other character had been received LO would have operated.

It is assumed that these two characters are sufficient for station discrimination. It is arranged therefore that 3A having opened LO's circuit it shall not be re-closed until the space following the K is received.

To the "space" signal, sent as a letter, first 4A and then 4B relay operates, 4B re-closing LO's circuit.

To the next signal, D, first 5A and then 5B relay operates, as before any other received character operating LO.

The next character, space, sent as a letter is inoperative, the circuit waiting for an F, LO's circuit having been opened at 5A.

When the character is received, first 6A, then 6B operates, extending but not completing LO's circuit.

The circuit now waits for a figure shift to which, when it is received, first 7A and then 7B operates, reconnecting LO's winding to contacts k1. 7B prepares the circuit of ten hundreds relays C1A . . . C0A, C1A being operated by the next signal 1, is followed in the group C1B . . . C0B by C1B.

C1B operates a common relay CR which opens the operating circuit of the hundreds relays and closes those of the tens relays X1A . . . X0A (not shown).

The next signal, 2, operates relay X2A, which is followed by X2B.

X2B operates a common relay XR which opens the operating circuit of the tens relays and closes those of the units relays U1A . . . U0A.

The next signal, 3, operates relay U3A, which is followed by U3B.

U3B operates a common relay UR which opens the generating circuits of the tens relays.

It will be noticed that the units digit having been received, the circuit of relay LO is finally opened so that further signals will not break down the set up.

2 position indication register

Via a combination of contacts of the CB, XB, UB relays in the sorter, a particular relay 123B of a large number of such relays is operated. This relay extends the + and − signal wires to a mechanically or magnetically latching relay 123L unique to the signalled apparatus and according to the polarity of the received signal so this relay is positioned.

According as 123L is in one or other position so either a red or green lamp is lit, a buzzer being sounded for disagreement between the position of 123L and a corresponding key 123K. This permits an audible alarm to be given of a change of position.

The register shown is indicating, but if the windings of relay 123L were replaced by the close and trip coils of a circuit breaker, the register would be controlling.

Further modification of the source (Fig. 14)

The source shown in Fig. 2 pertained to an equipment having two possible positions only. The circuit now to be described is appropriate to an equipment having more than two and perhaps a large number of possible positions, an example being for instance a meter of which the readings are to be transmitted.

The part of the circuit that includes leads CB, ST, CA, ZZ, S, SW is exactly as in Fig. 2, while the switch SA is generally similar. The distinctive component in this circuit is the switch SC which is positioned to correspond with the indication to be transmitted.

When the indicator changes position the contact "Change in Progress" closing operates relay CR which at contact cr1 closes a locking circuit for itself and at cr2 causes the selector SR to drive under self-interruption until its wiper SC1 completes a circuit from relay contact cr3 via the bank and moving wiper of the indicator to operate relay T which at t1 opens the driving circuit of the selector SC. In this way selector SC keeps in step with the indicator. When the indicator finally stops the "Change in Progress" contacts open, leaving CR held on its locking circuit. When, in addition, SC is aligned to the indicator position the operation of T at t2 opens CR's holding circuit; CR releases, releasing relay T.

When CR first operated, at cr4 it operated slow releasing relay CS preparing a circuit at cs1 so that when CR releases it operates relay LA via contact cr4. LA closes a locking circuit for itself via la1 and when slowly following the release of CR, CS releases LA is left held.

What is claimed is:

1. In a system for the electrical supervision of apparatus, switching means having contacts in a position corresponding to an apparatus condition to be registered, stepwise switching means controlled by said switching means contacts to produce in a series of steps a series of groups of simultaneous direct current markings classifying said condition for a type of registration, said steps being followed by further steps to produce marking groups identifying the apparatus causing said condition, said further steps being followed by at least one step to produce a further marking group characterizing said condition, and means for translating said simultaneous current markings into consecutive signals of the teleprinter type.

2. In an electrical supervisory system, switching means having contacts in a position corresponding to a condition to be supervised, and further switching means adapted depending upon said position to assume a predetermined sequence, for producing in each of said positions a number of simultaneous impulses corresponding to a code so that in said sequence of positions a train of codes is produced.

3. In a system for the electrical supervision of apparatus, a number of switching means each having contacts in a position corresponding to the condition of an apparatus to be supervised, a number of further switching means each adapted to assume a sequence of positions for producing in each of said positions a group of simultaneous impulses representing a code so that in said sequence of positions a train of codes is produced, a sender adapted to be connected selectively to each one of the sequence switch means, and means initiated by a change in condition of one of the apparatus for connecting and operating the associated one of the sequence switching means, said connection being effective depending upon the operative condition of said sender.

4. In a system for the electrical supervision of apparatus, a number of switching means each having contacts in a position corresponding to the condition of an apparatus to be supervised, a number of further switching means each adapted to assume a sequence of positions for producing in each position a group of simultaneous impulses representing a code so that in said sequence of positions a train of codes is produced, a sender adapted to be connected selectively to each one of the sequence switching means, relay means controlled from the sequence switching means of one apparatus when said sequence switching means is connected, said relay means preparing the connection of a sequence switching means of another cyclically predetermined apparatus so as to determine the order in which the different sequence switching means shall be connected, and means initiated by a change in condition of one of the apparatus for connecting and operating the associated sequence switching means, said connection being effective depending upon said relay means.

5. In a system for the electrical supervision apparatus, a number of switching means each having contacts in a position corresponding to the condition of an apparatus, a number of further switching means each adapted to assume a sequence of positions for producing in each position a number of simultaneous impulses representing a code so that in sequence of said positions a train of codes is produced, a sender adapted to be connected selectively to each one of the sequence switching means, the operation of any one of the sequence switching means depending upon both the change in the position of said contacts and upon the operation of any other of the sequence switching means, and registering relay means controlled from the sequence switching means of each of the apparatus.

6. In a system for the electrical supervision of apparatus, a number of switching means each having contacts in a position corresponding to the condition of an apparatus, a number of further switching means each adapted to assume a sequence of positions for producing in each position a number of simultaneous current pulses representing a code so that in said sequence of positions a train of codes is produced, means depending upon a change in condition of one of the apparatus for preparing the associated sequence switching means for sending, a plurality of cold cathode gas discharge tubes in series with a corresponding plurality of relays adapted to be selectively connected to each one of said sequence switch means so as successively to receive a corresponding plurality of simultaneous impulses derived from successive positions of said sequence switching means, a telegraph relay, and circuit means for connecting said plurality of relays one after the other to said telegraph relay.

7. In a system for the electrical supervision of apparatus, a number of switching means each having contacts in a position corresponding to the condition of an apparatus, a number of further switching means each adapted to assume a sequence of positions for producing in each position a number of simultaneous current pulses representing a code so that in said sequence of positions a train of codes is produced, means depending upon a change in condition of one of the apparatus for preparing the associated sequence switching means for sending, a plurality of cold cathode gas discharge tubes in series with a corresponding plurality of relays adapted to be selectivly connected to each of said sequence switching means so as successively to receive a corresponding plurality of simultaneous impulses derived from successive positions of said sequence switching means, a telegraph relay, a pendulum relay, counting relays successively operated by said pendulum relay in succeeding pendulations thereof and connecting said plurality of relays one after the other with said telegraph relay to translate the simultaneous current pulses of the sequence switching means into time consecutive pulses of the teleprinter type.

8. A system according to claim 7 wherein said switching means representing the condition of an apparatus comprises a relay operated when a change-over occurs in the condition of said apparatus, and further comprising a sender including a relay and a receiver including a teleprinter, said sender relay being connected over contacts of the change-over relay when operated, a condenser charged over contacts of said sender relay when not operated, a third relay operated to its space side from said sender relay for the time that it takes for said condenser to discharge so as to send out during said time a start pulse for starting the teleprinter at the receiver in preparation for the receipt of a message.

9. A system according to claim 7 wherein said switching means representing the condition of an apparatus comprises a relay operated when a change-over occurs in the condition of said apparatus, and further comprising a sender including a relay and a receiver including a teleprinter, said sender relay being connected over contacts of the change-over relay when operated, a condenser charged over contacts of said sender relay when not operated, a third relay operated to its space side from said sender relay for the time that it takes for said condenser to discharge so as to send out during this time a start pulse for starting the teleprinter at the receiver in preparation for the receipt of a message, the first sending operation consisting of at least one space condition forming a start, intermediate operations consisting of five steps corresponding to mark or space as determined by the position of the sequence switching means, and the last operation consisting of at least one long mark condition forming a stop.

10. A system according to claim 7 wherein said switching means representing the condition of an apparatus comprises a relay operated when a change-over occurs in the condition of said apparatus, further comprising a sender including a relay and a receiver including a teleprinter, said sender relay being connected over contacts of the change-over relay when operated, a condenser charged over contacts of said sender relay when not operated, a third relay operated to its space side from said sender relay for the time that it takes for said condenser to discharge so as to send out during said time a start pulse for starting the teleprinter at the receiver in preparation for the receipt of a message, the first sending operation consisting of at least one space condition forming a start, intermediate operations consisting of five steps corresponding to mark or space as determined by the position of the sequence switching means, and the last operation consisting of at least one long mark condition forming a stop, said first and last operations being fixed and said intermediate operations being mark or space according to the particular characters transmitted from said sequence switching means.

11. A system according to claim 1, wherein at the end of each message through a number of consecutive positions of the sequence switch a predetermined sequence of a plurality of characters is sent, the first and last few characters being fixed and intermediate ones being variable.

12. A system according to claim 1, wherein at the end of each message through a number of consecutive positions of sequence switch means, a predetermined sequence of characters is sent, said characters including in the order mentioned: figures, full stop, a number of spaces, carriage return, line feed and space.

13. A system according to claim 1, wherein at the end of each message a predetermined sequence of eleven characters is sent, said characters including in the order: mentioned figures, full stop, a number of spaces, carriage return, line feed and space, and further comprising means for disconnecting the transmission of said carrier return and line feed characters during periods of heavy traffic.

14. A system according to claim 1, wherein at the end of each message a predetermined sequence of eleven characters is sent, said characters including in the order mentioned: figures, full stop, a number of spaces, carriage return, line feed and space, and further comprising means for disconnecting the transmission of said carrier return and line feed characters during periods of heavy traffic, and a clock circuit depending upon traffic conditions for producing through positions of said sequence switching means corresponding to intermediate ones of said characters, a time character, a tens of minutes and a unit of minutes.

15. A system according to claim 1, wherein at the end of each message a predetermined sequence of eleven characters is sent, said characters including in the order mentioned: figures, full stop, a number of spaces, carriage return, line feed and space, and further comprising means for disconnecting the transmission of said carrier return and line feed characters during periods of heavy traffic, a clock circuit depending upon traffic conditions for producing through positions of said sequence switching means corresponding to intermediate ones of said characters, a time character, a tens of minutes and a unit of minutes, said clock circuit including stepping switch means stepped once every minute and stepping switch means stepped once every ten minutes, means depending upon a time indication call produced in a position of said sequence switching means for connecting the minute stepping switching means to operate selectively one of a series of registering relays, means for connecting the ten minute stepping switching means to operate selected ones of another series of registering relays, and switching means for passing pulses derived from selected registering relays to the pulse translating means.

16. A system according to claim 1, wherein at the end of each message a predetermined sequence of eleven characters is sent, said characters including in the order mentioned: figures, full stop, a number of spaces, carriage return, line feed and space, and further comprising means for disconnecting the transmission of said carrier return and line feed characters during periods of heavy traffic, and a clock circuit depending upon traffic conditions for producing through positions of said sequence switching means corresponding to the first three of said number of spaces, a time character, a tens of minutes and a unit of minutes, said clock circuit including a manual switch and means depending upon the operation of said manual switch for sending a time record at predetermined positions of the end-of-message signal, once every one-minute period during light traffic conditions, said time record having the form of a fixed time character followed by two characters denoting, respectively, the tens and units of minutes past the hour.

17. A system according to claim 1, wherein at the end of each message a predetermined sequence of eleven characters is sent, said characters including in the order mentioned: figures, full stop, a number of spaces, carriage return, line feed and space, and further comprising means for disconnecting the transmission of said carrier return and line feed characters during periods of heavy traffic, a clock circuit depending upon traffic conditions for producing through positions of said sequence switching means corresponding to the first ones of said number of spaces, a time character, a tens of minutes space and a unit of minutes space, and means depending upon heavy traffic conditions for disconnecting the clock circuit for the transmission of the time records and succeeding spaces.

18. A system according to claim 1, wherein at the end of each message a predetermined sequence of eleven characters is sent, said characters including in the order mentioned: figures, full stop, a number of spaces, carriage return, line feed and space, and further comprising means for disconnecting the transmission of said carrier return and line feed characters during periods of heavy traffic, a clock circuit depending upon traffic conditions for producing through positions of said sequence switching means corresponding to the first ones of said number of spaces, a time character, a tens of minutes and a unit of minutes, and means depending upon the restoration of the time key to normal during transmission of the time record for disconnecting the clock circuit for disconnecting the transmission of at least some of the last spaces succeeding the time record.

19. A system according to claim 1, wherein at the end of each message a predetermined sequence of eleven characters is sent, said characters including in the order mentioned; figures, full stop, a number of spaces, carriage return, line feed and space, and further comprising means for disconnecting the transmission of said carrier return and line feed characters during periods of heavy traffic, a clock circuit depending upon traffic conditions for producing through positions of said sequence switching means corresponding to the first three of said six spaces, a time character, a tens of minutes and a unit of minutes, and means depending upon the operation of switching means contacts corresponding to the condition of another apparatus to be registered, said operation occurring during transmission of the time record, for disconnecting the clock circuit for the transmission of at least some of the last spaces succeeding the time record.

20. A system according to claim 1, wherein at the end of each message a predetermined sequence of eleven characters is sent, said characters including in the order mentioned: figures, full stop, a number of spaces, carriage return, line feed and space, and further comprising means for disconnecting the transmission of said carrier return and line feed characters during periods of heavy traffic, a clock circuit depending upon traffic conditions for producing through positions of said sequence switching means corresponding to first ones of said number spaces, a time character, a tens of minutes and a unit of minutes, said clock circuit including stepping switch means stepped once every minute, and stepping switch means stepped once every ten minutes, means depending upon a time indication call from the sequence switch means for registering the present position of the minute switching means, including means for selectively operating a series of relays, registering means for registering the present position of the ten minute switching means including means for selectively operating another series of registering relays, relay means for passing the impulses obtained from said selected registering relays over positions of the sequence switch means, lamp circuit means indicating the time corresponding to the position on which the stepping switches are standing including units lamps used on association with contacts of the unit stepping switch and tens lamp used on association with contacts of the tens stepping switch, keys being provided to operate the stepping switches in order that the lamp operation may be aligned to correspond to the correct time.

21. In an electrical supervisory system, a clock circuit including a number of relay means, a number of senders each including relay means connected during the end-of-message signal to one of the relay means of the clock circuit, said connection including further relay means released during periods of heavy traffic.

22. In an electrical supervisory system, a clock circuit including a number of relay means, a number of senders including relay means connected during the end-of-message signal to one of the relay means of the clock circuit, said connection including further relay means released during periods of heavy traffic so as to interrupt the sending of at least some consecutive characters of the end-of-message signal, said further relay means being released when at least an additional one of the senders becomes operative during the transmission of at least some characters of the end-of-message signal.

23. In an electrical supervisory system, a number of senders, a common clock circuit including time registertering means, time changing means controlling said time registering means, and a number of relay means controlled by said time registering means, each of the senders including relay means operated during the end-of-message signal so as to complete the connection to one of the relay means of the clock circuit, said connection including additional relay means operable during the first characters of the end-of-message signal upon the operation of said time changing means to establish, for the period of change of time, a circuit for holding over transmission from the clock circuit until the transmission of the time signal is completed correctly.

24. In an electrical supervisory system, a common clock circuit including a number of registering means, a number of senders each including relay means connected during the end-of-message signal to one of the relay means of the clock circuit, said connection including further relay means released during preiods of heavy traffic so as to interrupt the sending of at least some of the intermediate characters of the end-of-message signal, said further relay means being released when at least an additional one of said senders becomes operative during the transmission of the end-of-message signal, other relay means operable from the relay means of the clock circuit, to initiate sending but released during sending, and additional relay means depending upon the latter release and upon an additional operation of the relay means of the clock circuit during said release to cause sending of space characters instead of the time record.

25. In an electrical supervisory system, a number of senders, a common clock circuit including time registering means, time changing means controlling said time registering means, and a number of relay means controlled by said time registering means, each of the senders including relay means operated during the end-of-message signal so as to complete the connection to one of the relay means of the clock circuit, said connection including further relay means released during periods of heavy traffic so as to interrupt the sending of at least some of the intermediate characters of the end-of-message signal, said further relay means being released when at least an additional one of said senders becomes operative during the transmission of the end-of- message signal, other relay means operable from the relay means of the clock circuit, to initiate sending but released during sending, and additional relay means depending upon the latter release and upon an additional operation of the relay means of the clock circuit during said release to cause sending of space characters instead of the time record, said additional relay means being also operable during the first characters of the end-of-message signal upon the operation of said time changing means, said other relay means being short-circuited during said change of time.

26. In an electrical supervisory system, pendulum relay means, high speed relay means connected to be energized while said pendulum relay means swings through its medium position, the time of energization being a fraction of the time of one pendulation, a series of counting relay means connected to be successively energized by successive pendulations of said pendulum relay means, repeater relay means, and operating circuits controlled by said repeater relay means through said counting relay means.

27. In an electrical supervisory system, pendulum relay means, high speed relay means connected to be energized while said pendulum relay means swings through its medium position, the time of energization being a fraction of the time of one pendulation, a series of counting relay means connected to be successively energized by successive pendulations of said pendulum relay means, repeater relay means, operating circuits controlled by said repeater relay means through said counting relay means, the pendulum relay means having a frequency of oscillation of the order of 25 cycles per second, the high speed relay means having a speed of the order of one millisecond, and a time delay circuit in series therewith and limiting the energization of the high speed relay to a duration of the order of two seconds about the midpoint of each swing.

28. In an electrical supervisory system, pendulum relay means, high speed relay means connected to be energized while said pendulum relay means swings through its medium position, the time of energization being a fraction of the time of one pendulation, a series of counting relay means connected to be successively energized by successive pendulations of said pendulum relay means, repeater relay means, operating circuits controlled by said repeater relay means through said counting relay means, the pendulum relay means having a frequency of oscillation of the order of 25 cycles per second, the high speed relay means having a speed of the order of one millisecond, and a time delay circuit in series therewith and limiting the energization of the high speed relay to a duration of the order of two seconds about the midpoint of each swing, said time delay circuit containing a condenser and contacts connected in series therewith, one on each side of said condenser, and controlled by said pendulum relay means in opposite end positions thereof so as to charge said condenser during each pendulation equally and in opposite directions, thereby limiting energization of the high speed relay to a predetermined duration about the midpoint between said end positions.

29. In an electrical supervisory system, pendulum relay means, high speed relay means connected to be energized while said pendulum relay means swings through its medium position, the time of energization being a fraction of the time of pendulation, a series of counting relay means connected to be successively energized by successive pendulations of said pendulum relay means, repeater relay means, operating circuits controlled by said repeater relay means through said counting relay means, the pendulum relay means having a frequency of oscillation of the order of 25 cycles per second, the high speed relay means having a speed of the order of one millisecond, and a time delay circuit in series therewith and limiting the energization of the high speed relay to a duration of the order of two seconds about the midpoint of each swing, said time delay circuit containing a condenser and contacts in series therewith, one on each side of said condenser, and controlled by said pendulum relay means in opposite end positions thereof so as to charge said condenser during each pendulation equally and in opposite directions, thereby limiting energization of the high speed relay to a predetermined duration about the midpoint between said end positions, rectifier means being provided to prevent earth feedback from the counting relay means to the high speed relay means.

30. A system according to claim 26, comprising five counting relays and five operating circuits, said operating circuits including relay means for energizing thirty-two lines depending upon permutations of said five circuits so as to translate a five-impulse permutation code into a predetermined potential applied to a desired one of said thirty-two lines.

31. A system according to claim 26, comprising a series of groups of relays including a first group having relays connected to respond to different combinations of a first group of consecutively transmitted characters, and a second group having relays connected to respond to the different characters of a subsequent group of consecutively transmitted characters, a number of lines each having a number of registering devices connected thereto, said first group of characters being transmitted from the operating circuits to select a predetermined line, said second group of characters being transmitted from the operating circuits after said first group to select a predetermined registering device on said line, said registering devices being adapted to exercise a function in accordance with a character subsequently transmitted from said operating circuits.

32. A system according to claim 28, comprising a series of groups of relays including a first group having relays connected to respond to different combinations of a first group of consecutively transmitted characters, and a second group having relays connected to respond to the different characters of a subsequent group of consecutively transmitted characters, a number of lines each having a number of registering devices connected thereto, said first group of characters being transmitted from said operating circuits to select a predetermined line, said second group of characters being transmitted from the operating circuits after said first group to select a predetermined registering device on said line, said registering device being adapted to exercise a function in accordance with a character subsequently transmitted from said operating circuits, said registering devices including sequence switching means controlled by said latter character to assume a selected one of a number of positions.

ERIC MALCOLM SWIFT McWHIRTER.
HUGH JENNINGS WARD.

REFERENCES CITED

The following references are of record in the file of this patent:

UNITED STATES PATENTS

| Number | Name | Date |
|---|---|---|
| 1,616,186 | Harlow | Feb. 1, 1927 |
| 1,803,614 | Hershey | May 5, 1931 |
| 1,814,902 | Dirkes | July 14, 1931 |
| 1,864,074 | Krum | June 21, 1932 |
| 1,877,635 | Antoniono | Sept. 13, 1932 |
| 1,895,718 | Kleinschmidt | Jan. 31, 1933 |
| 2,056,452 | Hoover | Oct. 6, 1936 |
| 2,165,892 | Green | July 11, 1993 |
| 2,172,511 | Johnson | Sept. 12, 1939 |
| 2,207,744 | Larson | July 16, 1940 |
| 2,225,657 | Potts | Dec. 24, 1940 |
| 2,317,995 | Krum | May 4, 1943 |
| 2,357,297 | Wack | Sept. 5, 1944 |
| 2,375,383 | Potts | May 8, 1945 |